(12) United States Patent
Duffy et al.

(10) Patent No.: US 11,418,047 B2
(45) Date of Patent: Aug. 16, 2022

(54) BATTERY CHARGING METHOD AND SYSTEM DEPENDING ON AMBIENT TEMPERATURE

(71) Applicant: Riot Energy, Inc., Camarillo, CA (US)

(72) Inventors: Joshua Duffy, Moorpark, CA (US); Matthew Fleenor, Arroyo Grande, CA (US); Reza Pourdarvish, Camarillo, CA (US); Timothy W. Powers, Thousand Oaks, CA (US)

(73) Assignee: RIOT ENERGY, INC., Camarillo, CA (US)

( * ) Notice: Subject to any disclaimer, the term of this patent is extended or adjusted under 35 U.S.C. 154(b) by 91 days.

(21) Appl. No.: 16/619,199

(22) PCT Filed: Jun. 4, 2018

(86) PCT No.: PCT/US2018/035828
§ 371 (c)(1),
(2) Date: Dec. 4, 2019

(87) PCT Pub. No.: WO2018/226571
PCT Pub. Date: Dec. 13, 2018

(65) Prior Publication Data
US 2020/0177011 A1 Jun. 4, 2020

Related U.S. Application Data

(60) Provisional application No. 62/515,061, filed on Jun. 5, 2017.

(51) Int. Cl.
*H02J 7/16* (2006.01)
*H02J 7/00* (2006.01)
(Continued)

(52) U.S. Cl.
CPC ..... *H02J 7/007194* (2020.01); *H01M 10/443* (2013.01); *H01M 10/486* (2013.01);
(Continued)

(58) Field of Classification Search
USPC .......................................... 320/150–154, 132
See application file for complete search history.

(56) References Cited

U.S. PATENT DOCUMENTS

| 4,390,828 A | 6/1983 | Converse et al. |
| 2009/0104510 A1* | 4/2009 | Fulop ............... H01M 10/44 429/50 |

(Continued)

FOREIGN PATENT DOCUMENTS

| WO | 2016/176236 | 11/2016 |
| WO | 2016/204734 | 12/2016 |

OTHER PUBLICATIONS

International Search Report for PCT/US2018/035828 dated Aug. 31, 2018.
(Continued)

*Primary Examiner* — Samuel Berhanu
(74) *Attorney, Agent, or Firm* — Honigman LLP; Andrew N. Weber; Jonathan P. O'Brien

(57) ABSTRACT

A method for charging a rechargeable battery comprises estimating an initial state of charge of the battery ($SOC_O$), which may be estimated based on a time to polarization or an initial voltage of the battery. The method also comprises charging the battery according to a first charging strategy if the initial state of charge ($SOC_O$) is greater than a threshold state of charge ($SOC_X$) and according to a second charging strategy if the initial state of charge ($SOC_O$) is less than the threshold state of charge ($SOC_X$). The first charging strategy comprises charging, by charging circuitry, the battery at a temperature-independent constant charge voltage ($CV_{XT}$)
(Continued)

and at a first current ($I_1$) with power provided from a power source in electrical communication with the charging circuitry. The second charging strategy comprises obtaining, by the charging circuitry, an environmental temperature ($T_E$) measured by a temperature sensor in communication with the charging circuitry; calculating, by the charging circuitry, a temperature-based constant charge voltage ($CV_T$) based on the environmental temperature ($T_E$); and charging, by the charging circuitry, the battery at the temperature-based constant charge voltage ($CV_T$) and at a second current ($I_2$) with power provided from the power source.

18 Claims, 19 Drawing Sheets

(51) Int. Cl.
*H01M 10/44* (2006.01)
*H01M 10/48* (2006.01)

(52) U.S. Cl.
CPC ........ *H02J 7/00041* (2020.01); *H02J 7/0048* (2020.01); *H02J 7/0071* (2020.01); *H02J 7/00714* (2020.01); *H02J 7/007182* (2020.01)

(56) References Cited

U.S. PATENT DOCUMENTS

| | | | |
|---|---|---|---|
| 2013/0207618 A1* | 8/2013 | Renken | H01M 10/425 320/155 |
| 2014/0175869 A1* | 6/2014 | Phillips | H02J 9/061 307/10.1 |
| 2015/0188326 A1 | 7/2015 | Choi et al. | |
| 2015/0357859 A1* | 12/2015 | Pourdarvish | H02J 7/0047 320/159 |
| 2018/0175460 A1* | 6/2018 | Nguyen | H02J 7/0091 |

OTHER PUBLICATIONS

Written Opinion of the ISA for PCT/US2018/035828 dated Aug. 31, 2018.

* cited by examiner (Zone 2 near transition zone state of charge)

BATTERY CHARGING METHOD AND SYSTEM DEPENDING ON AMBIENT TEMPERATURE

CROSS REFERENCE TO RELATED APPLICATIONS

This U.S. nonprovisional application is the 35 USC § 371 national phase of PCT application no. PCT/US2018/035828, filed on Jun. 4, 2018, which claims priority to U.S. provisional application No. 62/515,061, filed on Jun. 5, 2017. Each of these documents is incorporated herein by reference in its entirety.

TECHNICAL FIELD

This disclosure relates to methods and systems for charging rechargeable batteries. Specifically, this disclosure relates to charging methods using a constant charge voltage based on environmental temperature, and multi-zone charging methods for rechargeable batteries, such as silver-zinc rechargeable batteries used in hearing aids, headphones, and other portable electronic devices.

BACKGROUND

Rechargeable batteries are known in the art and commonly used, for example, in portable electronic devices (e.g., hearing aids, headphones, earbuds and the like). Although conventional rechargeable batteries are useful, the systems and methods used to recharge the batteries are nevertheless susceptible to improvements that may enhance or improve their service life, shelf life, and/or performance. Therefore, a need exists in the art for the development of an improved apparatus for recharging batteries and a method for charging the same.

Methods of charging rechargeable batteries have previously been described, for example, methods using a termination time based on environmental temperature and methods where voltage and current are varied based on voltage plateaus and polarization peaks. The present invention improves upon prior methods by providing one or more advantages such as increased cycle life, increased charge cycle performance, counteracting the effects of aging and cycling on charging performance, extending lifespan and useable capacity by decreasing the rate of capacity fade, increasing capacity ratings, and avoiding undercharging.

SUMMARY

An aspect of the present disclosure provides a method for charging a rechargeable battery. The method comprises obtaining an environmental temperature measured by a temperature sensor in communication with the charging circuitry; calculating a constant charge voltage ($CV_T$) as a function of the environmental temperature ($T_E$); and initiating, by the charging circuitry, a charging session to charge the battery at the charge voltage ($CV_T$) and a charge current (I) with power provided from a power source in electrical communication with the charging circuitry.

In some implementations, the method further comprises calculating a termination current as a function of at least the environmental temperature ($T_E$). In some implementations, the method further comprises terminating the charging session when the charge current (I) is less than or equal to the termination current. In some implementations, the method further comprises terminating the charging session when the charge current (I) is less than or equal to the termination current and the current (I) is decreasing over time. In some implementations, calculating the termination current comprises calculating the termination current as a function of both the environmental temperature ($T_E$) and an initial state of charge of the battery ($SOC_0$).

In some implementations, the method further comprises obtaining a capacity (Q) of the battery; determining whether the capacity (Q) of the battery is greater than or equal to a target capacity ($Q_{tgt}$) for the battery; and terminating the charging session when the battery capacity (Q) is greater than or equal to the target capacity ($Q_{tgt}$). In some implementations, the method further comprises calculating a termination current based on the environmental temperature ($T_E$); obtaining a capacity (Q) of the battery; determining whether the capacity (Q) of the battery is greater than or equal to a target capacity ($Q_{tgt}$) for the battery; and terminating the charging session when the battery capacity (Q) is greater than or equal to the target capacity ($Q_{tgt}$) and the charge current (I) is less than or equal to the termination current. In some implementations, the termination current ($I_{end}$) is further based on an initial state of charge of the battery ($SOC_0$).

In some implementations, the battery comprises a silver-zinc battery. In some implementations, the battery comprises a single cell or two or more cells in series. In some implementations, the charging circuitry is implemented upon a silicon chip. In some implementations, the method is implemented using a microprocessor or integrator. In other implementations, the method is implemented without use of a microprocessor or integrator.

Another aspect of the disclosure provides a method for charging a rechargeable battery (e.g., a silver zinc rechargeable battery) with a first charging strategy or a second charging strategy. The method comprises estimating an initial state of charge of the battery ($SOC_0$). The method further comprises determining whether the initial state of charge of the battery ($SOC_0$) is greater than a threshold state of charge ($SOC_X$). When the initial state of charge of the battery ($SOC_0$) is less than or equal to the threshold state of charge ($SOC_X$), the method further comprises initiating a first charging strategy for charging the battery, the first charging strategy comprises charging, by the charging circuitry, the battery at a temperature-independent constant charge voltage ($CV_{XT}$) and at a first current ($I_1$) with power provided from a power source in electrical communication with the charging circuitry. When the initial state of charge of the battery ($SOC_0$) is greater than a threshold state of charge ($SOC_X$), the method further comprises initiating a second charging strategy for charging the battery, the second charging strategy including: obtaining an environmental temperature ($T_E$) measured by a temperature sensor in communication with the charging circuitry; calculating a temperature-based constant charge voltage ($CV_T$) based on the environmental temperature ($T_E$); and charging, by the charging circuitry, the battery at the temperature-based constant charge voltage ($CV_T$) and at a second current ($I_2$) with power provided from the power source.

In some implementations, the second charging strategy further comprises calculating an "end" termination current ($I_{end}$) as a function of the environmental temperature ($T_E$); and terminating the charging of the battery when the second current ($I_2$) is less than the "end" termination current ($I_{end}$). In some implementations, the second charging strategy further comprises determining if the second current ($I_2$) is decreasing over time; and terminating the charging of the battery when the second current ($I_2$) is decreasing over time and is less than the "end" termination current ($I_{end}$).

In some implementations, the first charging strategy further comprises calculating a "max" termination current ($I_{max}$) as a function of the environmental temperature ($T_E$) and the initial state of charge ($SOC_0$); and terminating the charging of the battery when the first current ($I_1$) is less than or equal to the "max" termination current ($I_{max}$). In some implementations, the first charging strategy further comprises setting a target capacity ($Q_{tgt}$); determining a capacity (Q) of the battery; and terminating the charging of the battery when the first current ($I_1$) is less than or equal to the "max" termination current ($I_{max}$) and the battery capacity (Q) is at least the target capacity ($Q_{tgt}$).

In some implementations, the first charging strategy comprises redetecting battery voltage ($V_{batt}$) and changing to the second charging strategy if $V_{batt}$ is above a threshold voltage. In some implementations, the second charging strategy comprises calculating a running average of battery voltage over a time ($t_{ave}$) and changing to the first charging strategy if the running average of battery voltage is less than a threshold average voltage at $t_{ave}$.

In some implementations, the first charging strategy comprises detecting a battery chemistry error by charging the battery to a threshold voltage, pausing charging to allow the battery voltage to relax down to about the open circuit voltage (OCV) of the battery, and determining if the OCV is below a threshold OCV.

In some implementations, the threshold state of charge ($SOC_X$) is selected from a percentage between about 25% and about 75% of the battery's capacity. In some implementations, the threshold state of charge ($SOC_X$) is selected from a percentage between about 40% and about 60% (e.g., 50%) of the battery's capacity.

In some implementations, the method further comprises measuring a time to polarization ($t_p$) of the battery; wherein the initial state of charge ($SOC_0$) is estimated as a function of the time to polarization ($t_p$). In some implementations, the method further comprises measuring the battery voltage ($V_{batt}$); wherein the initial state of charge ($SOC_0$) is estimated as a function of battery voltage ($V_{batt}$).

In some implementations, the temperature-based constant charge voltage ($CV_T$) is bounded by a predetermined minimum charge voltage and a predetermined maximum charge voltage. For instance, $CV_T$ is greater than or equal to the minimum charge voltage and less than or equal to the maximum charge voltage. In some implementations, the environmental temperature ($T_E$) is obtained periodically (e.g., obtained on the order of every hour, every minute, or every second).

In some implementations, the first current ($I_1$) and the second current ($I_2$) are the same. In some implementations, the first current ($I_1$) and the second current ($I_2$) are different.

In some implementations, the battery is a silver-zinc battery. In some implementations, the battery comprises a single cell (e.g., a button cell or coin cell) or two or more cells in series. In some implementations, the charging circuitry is implemented upon a silicon chip.

Another aspect of the disclosure provides an apparatus for charging a rechargeable battery that comprises a temperature sensor configured to measure environmental temperature ($T_E$); charging circuitry in electrical communication with the temperature sensor and a power source. The charging circuitry is configured to obtain an environmental temperature ($T_E$) measured by the temperature sensor in communication with charging circuitry; calculate a constant charge voltage ($CV_T$) as a function of the environmental temperature ($T_E$); and initiate a charging session to charge the battery at the charge voltage ($CV_T$) and a charge current (I) with power provided from a power source in electrical communication with the charging circuitry.

Another aspect of the disclosure provides an apparatus for charging a rechargeable battery that uses a two-strategy charging method. The apparatus comprises a temperature sensor configured to measure environmental temperature ($T_E$); charging circuitry in electrical communication with the temperature sensor and a power source. The charging circuitry is configured to estimate an initial state of charge of the battery ($SOC_0$); determine whether the initial state of charge of the battery ($SOC_0$) is greater than a threshold state of charge ($SOC_X$); when the initial state of charge of the battery ($SOC_0$) is less than or equal to the threshold state of charge ($SOC_X$), initiate a first charging strategy for charging the battery, the first charging strategy comprises charging the battery at a temperature-independent constant charge voltage ($CV_{XT}$) and at a first current ($I_1$) with power provided from the power source in electrical communication with the charging circuitry; and when the initial state of charge of the battery ($SOC_0$) is greater than the threshold state of charge ($SOC_X$), initiate a second charging strategy for charging the battery, the second charging strategy including: obtaining an environmental temperature ($T_E$) measured by the temperature sensor in communication with the charging circuitry; calculating a temperature-based constant charge voltage ($CV_T$) based on the environmental temperature ($T_E$); and charging the battery at the temperature-based constant charge voltage ($CV_T$) and at a second current ($I_2$) with power provided from the power source.

In some embodiments, the apparatus comprises a single cell or two or more cells in series. In some embodiments, the battery is a silver-zinc battery. In some embodiments, the apparatus comprises a silicon chip implementing the charging circuitry and the temperature sensor. In some embodiments, the charging circuitry (e.g., the silicon chip) is located in a device powered by the battery, e.g., the device being a hearing aid, headphones, or other portable electronic device. In some embodiments, the charging circuitry (e.g., the silicon chip) is located in a battery door of the electronic device that is coupled to the battery to create a battery door module. In other embodiments, the charging circuitry (e.g., the silicon chip) is located in a charging base, the charging base configured to electrically connect to the battery and the power source (e.g., by mating with the electronic device powered by the battery).

Another aspect of the disclosure provides a charging system that comprises a rechargeable battery (e.g., a silver-zinc rechargeable battery) configured to provide power to electrical components of a device; a power source; a temperature sensor; and a charger including charging circuitry in electrical communication with the power source and the battery when the battery is docked with the charging circuitry. The charging circuitry of the charging system obtaining an environmental temperature measured by the temperature sensor in communication with charging circuitry; calculating a constant charge voltage ($CV_T$) as a function of the environmental temperature ($T_E$); and initiating a charging session to charge the battery at the charge voltage ($CV_T$) and a charge current (I) with power provided from the power source in electrical communication with the charging circuitry.

Another aspect of the disclosure provides a charging system for a multi-strategy charging method, the charging system including a rechargeable battery configured to provide power to electrical components of a device; a power source; and a charger including charging circuitry in electrical communication with the power source and the battery when the battery is docked with the charging circuitry. The charging circuitry of the charging system estimating an initial state of charge of the battery ($SOC_0$); determining whether the initial state of charge of the battery ($SOC_0$) is greater than a threshold state of charge ($SOC_X$); when the initial state of charge of the battery ($SOC_0$) is less than or equal to the threshold state of charge ($SOC_X$), initiating a first charging strategy for charging the battery, the first charging strategy comprises charging the battery at a temperature-independent constant charge voltage ($CV_{XT}$) and at a first current ($I_1$) with power provided from the power source in electrical communication with the charging circuitry; and when the initial state of charge of the battery ($SOC_0$) is greater than a threshold state of charge ($SOC_X$), initiating a second charging strategy for charging the battery, the second charging strategy including: obtaining an environmental temperature ($T_E$) measured by the temperature sensor in communication with the charging circuitry; calculating a temperature-based constant charge voltage ($CV_T$) based on the environmental temperature ($T_E$); and charging the battery at the temperature-based constant charge voltage ($CV_T$) and at a second current ($I_2$) with power provided from the power source.

In some embodiments, the battery comprises a silver-zinc battery. In some embodiments, the battery-powered device comprises a hearing aid device, headphones, or other portable electronic device. In some embodiments, the charging circuitry is located within the battery-powered device. In some embodiments, the charging circuitry is located in a battery door of the battery-powered device that is coupled to the battery to form a battery door module. In other embodiments, the charging circuitry is located within a charging base external to the battery-powered device.

DESCRIPTION OF DRAWINGS

The following figures are provided by way of example and are not intended to limit the scope of the invention.

Like reference symbols in the various drawings indicate like elements.

DETAILED DESCRIPTION

Figure 1A:
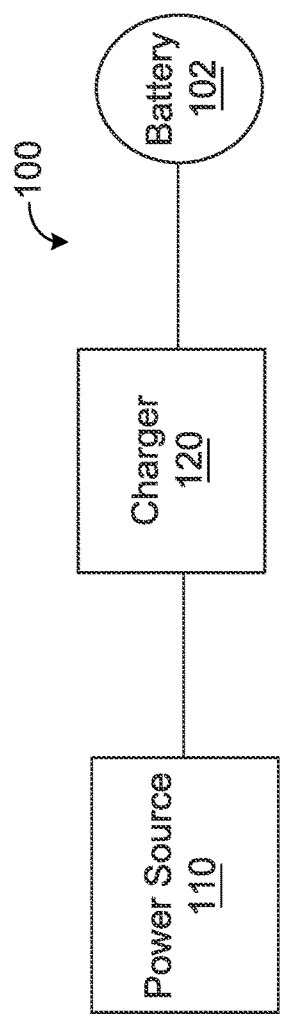
FIGS. 1A and 1B are schematic views of an example system for charging a rechargeable silver-zinc battery.

Provided herein are methods, apparatuses, and systems for charging a rechargeable battery.

I. Definitions

As used herein, the terms "rechargeable battery", "battery", "electrochemical cell" and "cell" are used interchangeably and refer to rechargeable or secondary electrical energy storage devices comprising one electrochemical cell (e.g., a coin cell or button cell) or a plurality of electrochemical cells. For secondary or rechargeable batteries, a battery cathode is designated as the positive electrode during discharge, and a battery anode is designated as the negative electrode.

Batteries and battery electrodes are denoted with respect to the active materials in the fully-charged state. For example, a silver-zinc battery comprises an anode comprising zinc and a cathode comprising silver (e.g., a silver powder (e.g., AgO, $Ag_2O_3$, or other silver material)). Nonetheless, more than one species is present at a battery electrode under most conditions. For example, a zinc electrode generally comprises zinc metal and zinc oxide (except when fully charged), and a silver powder electrode usually comprises AgO, $Ag_2O_3$ and/or $Ag_2O$ and silver metal (except when fully discharged).

As used herein, "state of charge" and "SOC" are used interchangeably and refer to the available capacity remaining in a battery, expressed as a percentage of the cell or battery's capacity, e.g., the cell or battery's rated capacity. A battery's "initial SOC" refers to the state of charge of the battery before the battery undergoes charging or recharging.

As used herein, "depth of discharge" and "DOD" are used interchangeably to refer to the measure of how much energy has been withdrawn from a battery or cell, often expressed as a percentage of capacity, e.g., rated capacity. For example, a 100 Ah battery from which 30 Ah has been withdrawn has undergone a 30% depth of discharge (DOD).

As used herein, "battery voltage" or "$V_{batt}$" refers to either the open circuit voltage of the battery or the voltage of the battery under load.

As used herein, "open circuit voltage" or "OCV" refers to the difference of electrical potential between two terminals of a battery when disconnected from a circuit, i.e., when no external load is connected and no external electric current flows between the terminals.

As used herein, "voltage under load" refers to the difference of electrical potential between two terminals of a battery when connected to a circuit and when an external load is connected and external electric current flows between the terminals. A properly functioning battery that is correctly connected to a voltage source will experience a slight voltage reduction (or voltage drop) from its open circuit voltage (OCV) when the battery is under load.

As used herein, "capacity" refers to the mathematical product of a cell's discharge current and the time (in hours) during which the current is discharged until the cell reaches a terminal voltage. Capacity is generally expressed in units of ampere·hours (Ah), or fractions thereof.

Similarly, the terms "actual capacity" or "theoretical capacity" refer to the capacity that a battery or electrochemical cell should theoretically discharge at 100% SOC based on the amounts of electrode materials present in the cell, the amount of electrolyte present in the cell, and the surface area of the electrodes. In general terms, the capacity of a cell/battery is the amount of charge available expressed in ampere·hours (Ah) or milliampere·hours (mAh). An ampere is the unit of measurement used for electrical current and is defined as a Coulomb of charge passing through an electrical conductor in one second. The capacity of a cell or battery is related to the quantity of active materials present, the amount of electrolyte present, and the surface area of the electrodes. The capacity of a battery/cell can be measured by discharging at a constant current until it reaches its terminal voltage, which depends on the cell's intended usage.

A cell's "rated capacity" is the average capacity delivered by a cell or battery on a specified load and temperature to a voltage cutoff point, as designated by the manufacturer for the cell's intended usage. For many types of cells, industry standards establish a cell's rated capacity, which is based on the cell's intended usage. It is noted that silver-zinc cells typically have a rated capacity that is about 70% or less (e.g., about 50% or less) of the cell's actual capacity.

As used herein, "Ah" refers to Ampere·Hour and is a scientific unit for the capacity of a battery or electrochemical cell. A derivative unit, "mAh" represents a milliamp hour and is 1/1000 of an Ah.

As used herein, "A" and "Amps" are used interchangeably and refer to a unit of electrical current, e.g., charge current. A derivative unit, "mA" refers to milliamps and is 1/1000 of an amp.

As used herein, "s", "sec" and "seconds" are used interchangeably and refer to the unit of time.

As used herein, "min" and "minutes" are used interchangeably and refer to the unit of time.

As used herein, "polarization peak", "$V_{pp}$", and "V_Pol_Peak" are used interchangeably and refer to a peak voltage value of a sharp spike in battery voltage that precedes a voltage plateau, which is observed when a rechargeable battery having a plurality of voltage plateaus, e.g., at least 2 voltage plateaus, is charged from a voltage of a first plateau to a voltage of a higher plateau with a charge current that is controlled to clamp the battery's voltage. Without limiting the scope of the present invention, it is believed that the polarization peak occurs when the state of flux in the internal chemistry (e.g., the oxidation state of the cathode material, the anode material, or both) of a rechargeable battery is maximized while the battery is being charged with a controlled current. This phenomenon is observed for silver-zinc batteries and others when a voltage plot is generated for a recharging battery when the charge current is substantially constant and controlled to clamp the battery voltage. An example of a voltage plot illustrating a polarization peak is provided in FIG. 3, wherein the polarization peak is identified as $V_{pp}$.

As used herein, "time to polarization" or "$t_p$" refers to the amount of time from a starting time (e.g., from the initiation of a charging session applying voltage and current to the battery) to the time when the battery voltage, $V_{batt}$, reaches a polarization peak.

As used herein, "charging circuitry" refers to an electric circuit that delivers current and voltage from a power source to a battery and controls the current and voltage delivered to the battery. The charging circuitry is in electrical communication with the power source and the battery. The charging circuitry may be fabricated or implemented on a silicon chip. The charging circuitry implements aspects of the methods described herein, such as obtaining environmental temperature from a temperature sensor, calculating charge parameters, initiating and terminating a charging session, and measuring battery conditions, such as battery voltage. In some implementations, the charging circuitry implements aspects of the methods described herein by use of a microprocessor or integrator. In other implementations, the charging circuitry implements aspects of the methods described herein without use of a microprocessor or integrator.

As used herein, "silicon chip" refers to a thin substrate of silicon on which an electric circuit, e.g., a micro-scale (or smaller) electric circuit, may be fabricated.

As used herein, "ASIC" refers to an application-specific integrated circuit, which is an integrated circuit (IC) customized for a particular use, rather than intended for general-purpose use. For instance, an ASIC may mediate (e.g., reduce or increase) the voltage delivered from a power source (e.g., a battery) to another electrical device (e.g., microphone, amplifier, display screen, or the like).

As used herein, "maintenance pulse" refers to an intermittent current and voltage applied to a battery, which is used to maintain the battery at its existing voltage.

II. Methods

The methods of the present invention may be used with any rechargeable battery, such as silver-zinc, lithium ion, nickel metal hydride, etc. In some implementations, the methods are used to charge or recharge a silver-zinc battery.

The methods may comprise calculating a temperature-based charge voltage ($CV_T$). In some implementations, the temperature-based constant charge voltage is used as the sole charge voltage. Alternatively, the temperature-based constant charge voltage may be used as part of a "hybrid" method comprising both a temperature-independent charge voltage and a temperature-dependent charge voltage. In some implementations, a first charging strategy uses a temperature-independent constant charge voltage ($CV_{XT}$) and a second charging strategy uses a temperature-based charge voltage ($CV_T$). The temperature-based charge voltage may be calculated as a function of the environmental temperature ($T_E$). In some implementations, the temperature-based charge voltage may be directly proportional to the environmental temperature. In some implementations, the temperature-based constant charge voltage may be bounded at an upper voltage limit, a lower voltage limit, or both. For example, the temperature-based constant charge voltage ($CV_T$) may be calculated as follows:

$$CV_T = CV_{max} - \left(\frac{CV_{max} - CV_{min}}{T_{max} - T_{threshold}}\right)(T_E - T_{threshold}) \quad (1)$$

where $CV_{max}$ is a predetermined maximum allowed constant voltage, $CV_{min}$ is a predetermined minimum allowed constant voltage, $T_{max}$ is a predetermined maximum temperature at which the battery may charge, $T_{threshold}$ is a temperature at which $CV_T = CV_{max}$, and $T_E$ is the environmental temperature. If $T_E$ is less than $T_{threshold}$, then $CV_T$ is set to $CV_{max}$. The environmental temperature $T_E$ may also be referred to as an ambient temperature, and may be measured periodically (e.g., every hour, every minute, or every second) or continuously. In some implementations, temperature is measured continuously. In some implementations, the temperature-based constant charge voltage ($CV_T$) is dynamically set based on the measured environmental temperature ($T_E$).

The method further comprises charging the battery with a charge current (I). In some implementations, e.g., multi-zone methods, the battery is charged with a first charge current ($I_1$) during a first charging strategy and is charged with a second charge current ($I_2$) during a second charging strategy. In some implementations, the current (I) (e.g., the first current ($I_1$) and/or the second current ($I_2$)) is a constant current. In some implementations, the first current and second current are the same. In some implementations, the first current and second current are different.

In some implementations, the charge voltage has a maximum charge voltage, e.g., 2.0 Volts (V). For example, the charge voltage should not exceed 2.0 V for more than 1 second continuously. In other examples, voltage ripple is allowed but the peak should not exceed 2.0 V. In some implementations, the charge current (I) has a minimum charge current, e.g., 0.5 mA. For example, the charge current (I) should not fall below 0.5 mA for more than 60 seconds continuously. As another example, the charge current (I) should not fall below 1 mA for more than 30 seconds continuously. Similarly, a maximum charge current may be used. In some implementations, a maximum charge time is set. In some implementations, the maximum charge time is based on the environmental temperature. Lower environmental temperatures decrease the conductivity of the cell and may require more time to charge the cell to a given capacity, compared to the time required to charge the cell to the given capacity at a higher temperature. For example, a nominal maximum charge time may be set for six (6) hours. As another example, a nominal maximum charge time may be set for ten (10) hours. In some implementations, the method comprises a minimum and/or maximum temperature for charging. For example, charging only occurs if the environmental temperature is between 10° C. and 40° C. In some implementations, a maximum charge capacity is set. The cell current may be integrated during charging to determine its charge capacity. In multi-zone charging methods, a first zone may have a first maximum capacity and a second zone may have a second maximum capacity.

The methods described herein may comprise calculating a temperature-based termination current. In multi-strategy methods, the temperature-based termination current may be used with the first charging strategy, the second charging strategy, or both. In some implementations, the second charging strategy may utilize a termination current referred to as an "end" termination current, $I_{end}$, and the first charging strategy may utilize a termination current referred to as a "max" termination current, $I_{max}$. In some implementations, the termination current, e.g., the "end" termination current ($I_{end}$), is calculated as a function of environmental temperature. In some implementations, the termination current, e.g., the "max" termination current ($I_{max}$), is calculated as a function of environmental temperature ($T_E$) and initial state of charge ($SOC_0$). In some implementations, charging is terminated if the current is less than or equal to the termination current, e.g., the "end" or "max" termination current ($I_{end}$ or $I_{max}$). In some implementations, the "end" termination current ($I_{end}$) is calculated as follows:

$$I_{end} = AT_E + B \quad (2)$$

where A and B are constants. The constants A and/or B may be based on battery chemistry. In some implementations, the "max" termination current ($I_{max}$) is calculated as follows:

$$I_{max} = CT_E - D(SOC_0) + I_{offset} \quad (3)$$

where C, D and $I_{offset}$ are constants. The constants C and/or D and/or $I_{offset}$ may be based on battery chemistry. In some implementations, the charging methods will terminate if the termination current is reached for a length of time. For example, if the current (I) is less than or equal to the termination current for at least 30 seconds continuously or at least 60 seconds continuously.

In some implementations, a "filter" timer is used to detect whether initial state of charge ($SOC_0$) is near a transition zone. The filter timer may determine if the charge current (I) reaches a threshold or maximum charge current over a fixed time period. If the charge current (I) reaches the threshold current over the fixed time period, a corresponding offset may be used for the termination current. For example, if charge current (I) reaches the threshold current over the fixed time period, then a first offset may be used to calculate the termination current; and if the charge current (I) does not reach the threshold current over the fixed time period, then a second offset may be used to calculate the termination current. For example, the first or second offset may be used as the constant, B, in the termination calculation for $I_{end}$.

The methods described herein may comprise one or more additional or alternative termination requirements, i.e., other than the current being less than or equal to a termination current. For example, in some implementations, the method comprises determining if the current is decreasing over time. The method may terminate charging when the current is less than or equal to a termination current and the current is decreasing over time. In some implementations, charging will not terminate even though the current is below a termination current unless the current is also decreasing over time. Stated differently, in some implementations, if the current is increasing or steady over time, charging will not terminate even if the current is below a termination current. In other implementations, the method may comprise calculating or setting a target capacity ($Q_{tgt}$); for instance, setting the target capacity ($Q_{tgt}$) at the rated capacity of the battery intended for recharging. The method may terminate charging when the current (I) is less than or equal to the termination current and the capacity (Q) is greater than or equal to the target capacity ($Q_{tgt}$). Alternatively, the method may terminate charging when the capacity (Q) is greater than or equal to the target capacity ($Q_{tgt}$) regardless of whether the current is less than or equal to the termination current. In some implementations, the method may comprise calculating or setting a maximum capacity ($Q_{max}$) that is greater than the target capacity ($Q_{tgt}$). The method may comprise terminating charging if the capacity (Q) is greater than or equal to the maximum capacity ($Q_{max}$) regardless of whether the current is below the termination current. Different combinations and permutations of termination conditions such as one or more minimum or threshold currents, one or more maximum or threshold capacities, a decrease in current over time, or a maximum charge time, may be used with the methods described herein. In some implementations, the termination conditions are monitored after the battery has completed an initial charging session where charging continues for a fixed time without termination.

In some implementations, the target capacity may be calculated as a function of time, e.g., the time to polarization. For example, the target capacity ($Q_{tgt}$) may be calculated as follows:

$$Q_{tgt} = mt_p + Q_{min} \quad (4)$$

wherein m is a constant, $t_p$ is the time to polarization, and $Q_{min}$ is a minimum charge capacity. A remaining charge capacity may also be calculated and used with the methods described herein. For example, a remaining charge capacity ($Q_{rem}$) may be calculated as follows:

$$Q_{rem} = Q_{tgt} - (I^* t_p)/60 \quad (5)$$

wherein I is the charge current. The remaining charge capacity is the charge capacity target minus the charge capacity that has already been charged into the cell. In some implementations, the capacity target is used as a termination condition, either alone or in conjunction with other termination conditions. For example, charging may terminate when one or more (e.g., two or more, or all) of the following conditions are met: capacity target is reached, current is below the termination current, or maximum charge time is reached.

In some implementations, the methods described herein are multi-strategy or multi-zone charging methods with more than one charging strategy or charging zone. The terms "multi-strategy" and "multi-zone" have the same meaning and are used interchangeably. For example, the methods may be two-strategy or two-zone methods. The methods may also be three-strategy or three-zone methods. Methods with four or more strategies or zones are also possible. Two-zone methods may comprise steps where the charging zone is determined by the initial state of charge ($SOC_0$) of the battery. The initial state of charge ($SOC_0$) may be estimated based on the voltage of the battery ($V_{batt}$). The initial state of charge ($SOC_0$) may be estimated based on the time to polarization ($t_p$) during initial charging of the battery. Other methods of estimating initial state of charge ($SOC_0$) may also be used and are known to those skilled in the art.

In some implementations, the charging method charges according to a first charging strategy if the initial state of charge ($SOC_0$) is below a threshold state of charge ($SOC_X$) and charges according to a second charging strategy if the initial state of charge ($SOC_0$) is above a threshold state of charge ($SOC_X$). The threshold state of charge may correspond to a transition zone of the discharge profile of the battery. The threshold state of charge may be a threshold value between about 25% and about 75% (e.g., 25%, 30%, 35%, 40%, 45%, 50%, 55%, 60%, 65%, 70% or 75%), a threshold value between about 40% and about 60% (e.g., e.g., 40%, 45%, 50%, 55%, or 60%). For example, the threshold state of charge may be 50%. In some instances, the SOC is the rated SOC (i.e., based on rated capacity) for the battery. In other instances the SOC is the actual SOC.

Battery voltage ($V_{batt}$), e.g., the open circuit voltage or the voltage under load, may be used to estimate the state of charge. In some implementations, the charging method charges according to a first charging strategy if the battery voltage is below a threshold battery voltage (V_Upper) and charges according to a second charging strategy if the battery voltage is above a threshold battery voltage (V_Upper). The threshold voltage (V_Upper) may correspond to a transition zone of the discharge profile of the battery, i.e., the threshold voltage (V_Upper) may be a voltage within the transition zone. The threshold voltage (V_Upper) may be a voltage value between about 1.4 V and about 1.9 V (e.g., 1.4 V, 1.5 V, 1.6 V, 1.7 V, 1.8 V or 1.9 V), or between about 1.5 V and about 1.8 V (e.g., 1.5 V, 1.6 V, 1.7 V or 1.8 V). For example, the threshold voltage (V_Upper) may be 1.7 V. For example, 1.7 V is within the transition zone of a discharge profile for a silver-zinc battery. In some implementations the battery voltage ($V_{batt}$) is measured as the open circuit voltage and the method determines whether the open circuit voltage is less than the threshold voltage (V_Upper). In some implementations, an open circuit voltage less than or equal to 1.7 V prior to charge indicates that the cell is discharged to a state of charge less than 50%. A second voltage threshold (V_Lower) may be used to estimate whether the state of charge is in a deeply discharged state. In some implementations, the charging method charges according to the first charging strategy if the battery voltage is above the second voltage threshold (V_Lower). In some implementations, an alert is activated before beginning charging according to the first charging strategy if the battery voltage is below the second voltage threshold (V_Lower). In some implementations, the charging method charges according to an over-discharge recovery strategy if the battery voltage is below the second voltage threshold (V_Lower). In some implementations, V_Lower is 1.2 V.

Multi-zone (also referred to as multi-strategy) charging methods may have one or more charging parameters that differ depending on the charging zone. For example, one or more of charge voltage, charge current, termination current, and target capacity may vary depending on the charging zone. In some implementations, a first charging zone charges using a temperature-independent constant charge voltage ($CV_{XT}$) and a second charging zone charges using a temperature-based constant charge voltage ($CV_T$). In some implementations, a first charging zone calculates an "end" termination current as a function of environmental temperature ($T_E$) and state of charge and a second charging zone calculates a "max" termination current as a function of environmental temperature ($T_E$). In some implementations, a first charging zone sets a first target capacity and a second charging zone sets a second target capacity.

Multi-zone (or multi-strategy) charging methods may switch the charging session from one zone (or strategy) to another zone (or another strategy). For example, charging may begin in a first zone and switch to a second zone. In some implementations, a deeply discharged battery will begin charging in a first zone until the state of charge (e.g., using the battery voltage as an estimate) has hit a threshold state of charge (e.g., a threshold voltage) and then switch to charging in a second zone.

In some implementations, where the battery has been over-discharged, a recovery strategy may be used. For example, the battery may be over-discharged if the open circuit voltage (OCV) of the battery is less than 1.2 V. As another example, the battery may be over-discharged if ASIC is in standby mode. In some implementations, the method comprises determining whether the charging circuitry 120 is in standby. If the charging circuitry is in standby, the method may further comprise charging the battery with a recovery strategy (e.g., a "Zone 0" strategy). The recovery strategy may comprise charging at a constant current and constant voltage.

In some embodiments, the charger can be described as a current limited voltage source. For example, when cell impedance is low, the charger delivers maximum allowed current as set by the charge algorithm; as cell impedance increases, cell voltage rises to the maximum allowed voltage and the charge current is reduced to regulate to that voltage.

III. Systems and Apparatuses

Figure 1B:
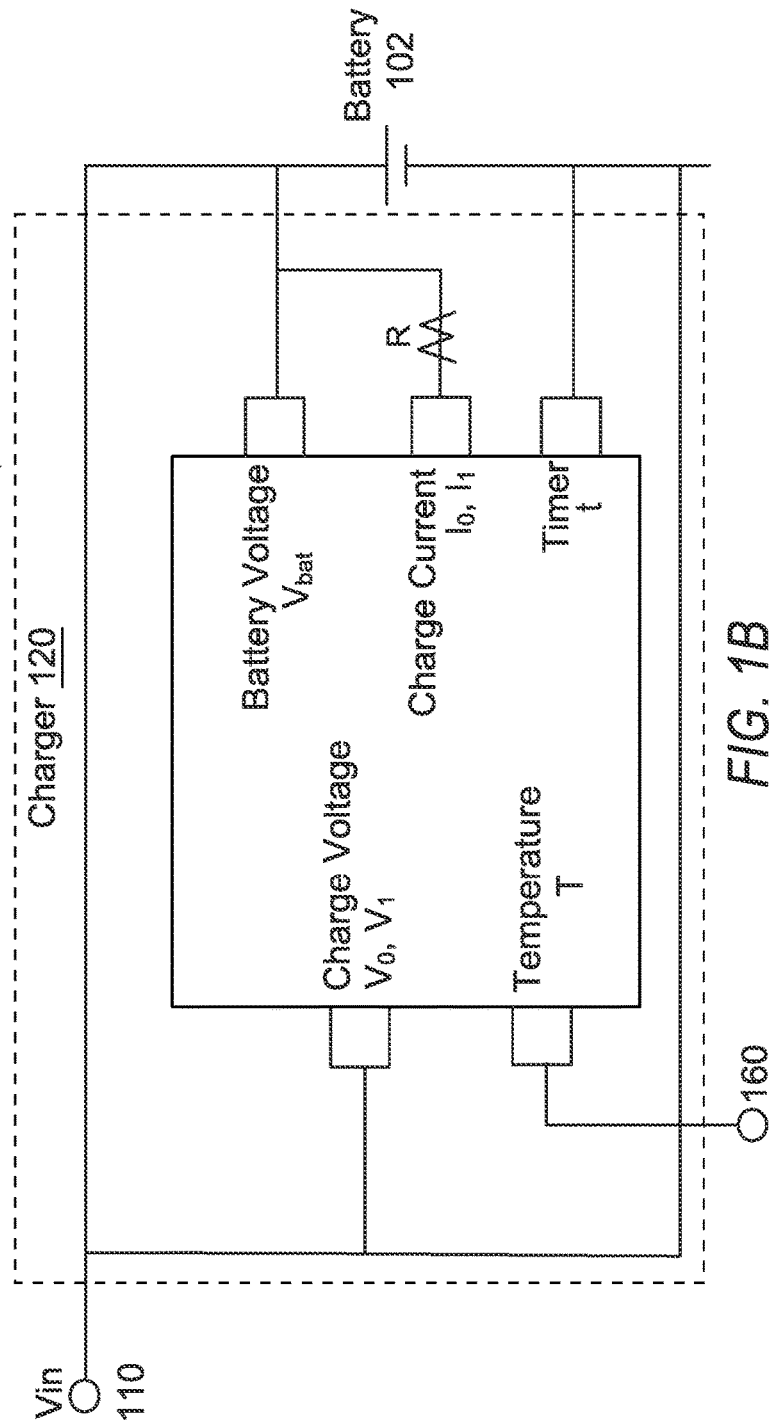

Referring to FIGS. 1A and 1B, in some implementations, a system 100 comprises charging circuitry 120 (e.g., charger) in electrical communication with a power source 110 to provide a constant charge voltage to charge a rechargeable battery 102 (or batteries) when the rechargeable battery is docked with the charging circuitry 120. As used herein, the terms "charging circuitry" and "charger" are used interchangeably. The battery 102 is docked with the charging circuitry 120 when the battery 102 is electrically or wirelessly connected to the charging circuitry 120 to undergo a charging session. In some implementations, the battery 102 comprises two or more batteries electrically connected in series with the charging circuitry 120 to undergo a charging session. Accordingly, the use of the term "battery 102" herein may refer to a single battery or multiple batteries connected in series.

In some examples, the battery 102 powers electrical components of a battery-powered device or system. For instance, the battery 102 (or batteries) may power a hearing aid device. The chip implements the example charger 120 and the charger 120 uses temperature data (i.e., environmental temperature ($T_E$)) to calculate the constant charge voltage for charging the battery 102. The chip may also monitor whether the battery protection circuitry has latched off during the charging session. Latching off of the battery protection circuitry may be used as an input to determine the appropriate charging strategy. A timer, t, may measure a time period during a charging session. For example, the timer may be used to measure the time from the initiation of the charging session until polarization, i.e., the time to polarization. In some implementations, the chip implementing the example charger 120 comprises a silicon chip. In some implementations, a microprocessor or integrator is used, e.g., together with the chip, to implement the example charger 120.

In some examples, the charging circuitry 120 is located within a small-battery powered device (e.g., hearing aid device, headphones, earbuds or the like) powered by the one or more batteries 102 (e.g., a button or coin cell). The small-battery powered device may comprise electrical contacts for electrically communicating with the power source 110 during a charging session or the small-battery powered device may be configured to wirelessly charge the battery 102 via induction with power received by the power source 110. In some embodiments, the charging circuitry 120 is located within a battery door coupled to the battery to make a battery door module. In other examples, the charging circuitry 120 is located within a charging base (e.g., power source 110) that receives the battery 102 or the battery-powered device housing the battery. In some scenarios, a portion of the charging circuitry 120 is located within the charging base while another portion of the charging circuitry 120 is located within the battery-powered device. Implementing the charging circuitry 120 upon the silicon chip reduces size and manufacturing costs. In some instances, a microprocessor and/or integrator are omitted from the charging system 100. In other instances, a microprocessor and/or integrator are included in the system 100, and may be used together with the silicon chip. In some implementations, the charging circuitry is in communication with an ASIC of the battery-powered device (e.g., a hearing aid). The ASIC may supply information via the charging circuitry for use in the methods of the present invention. The ASIC, or characteristics of the ASIC (e.g., FET), may be identified by the charger to confirm that the charger is connected to a device that is intended for use with the charger and charging method.

In some implementations, the rechargeable battery is a silver-zinc (AgZn) battery; however, the battery may comprise a lithium ion battery, a nickel metal hydride battery, or other rechargeable battery. Implementations herein will refer to the battery 102 as an AgZn battery. The charger 120 may determine what type of battery is being charged to adjust the charging parameters accordingly.

In some examples, the AgZn battery 102 comprises a maximum voltage ($V_{bat\_max}$) equal to an OCV of about 1.86 V (i.e., 1.7 V to 1.8 V under load). Thus, two AgZn batteries 102 in series comprises a $V_{bat\_max}$ equal to an OCV of about 3.72 V (i.e., 3.4 V to 3.6 V under load). The voltage of the AgZn battery 102 may increase up to 2.0 V during charge. The AgZn battery 102 may power electrical components of a hearing aid device that may comprise, but are not limited to, a microphone, an audio amplifier, related electrical circuitry, and a loud speaker. The power source 110 may comprise a wall outlet connected to the charger via a wall source or another device connected to the battery 102. In some examples, the power source 110 comprises a charging base powered by an associated battery or some other device. The example charger 120 may sense or obtain charge voltage ($V_0$, $V_1$) and charge current ($I_0$, $I_1$) received from the power source 110 in any suitable manner. For example, one or more resistors R may be used for obtaining charge current flow.

The example charger 120 may comprise a temperature sensor 160 to monitor ambient temperature ($T_E$). During a charging session, a timer (t) may increment from zero when a charging session begins. For example, the value of the timer t may correspond to a polarization time ($t_p$) indicating the time at which a voltage ($V_{batt}$) of the battery 102 reaches $V_{PP}$, wherein $V_{PP}$ is a peak polarization voltage or a predetermined voltage value near the peak polarization voltage (e.g., $V_{PP}$ is from about 50 to about 95 percent of the peak polarization voltage) during the charging session. In some implementations, the $V_{batt}$ corresponds to an open circuit voltage (OCV) of the battery 102 prior to the charging session or other scenarios when the battery 102 is not under load. In other implementations, the $V_{batt}$ corresponds to a voltage of the battery 102 under load. Generally, the value of the $V_{batt}$ under load measures at a value less than the value measured for the OCV. The example charger 120 may sense the charge current ($I_0$, $I_1$) thru the battery 102 (e.g., a single battery or two batteries in series) during the charging session.

IV. Examples

Figure 2:
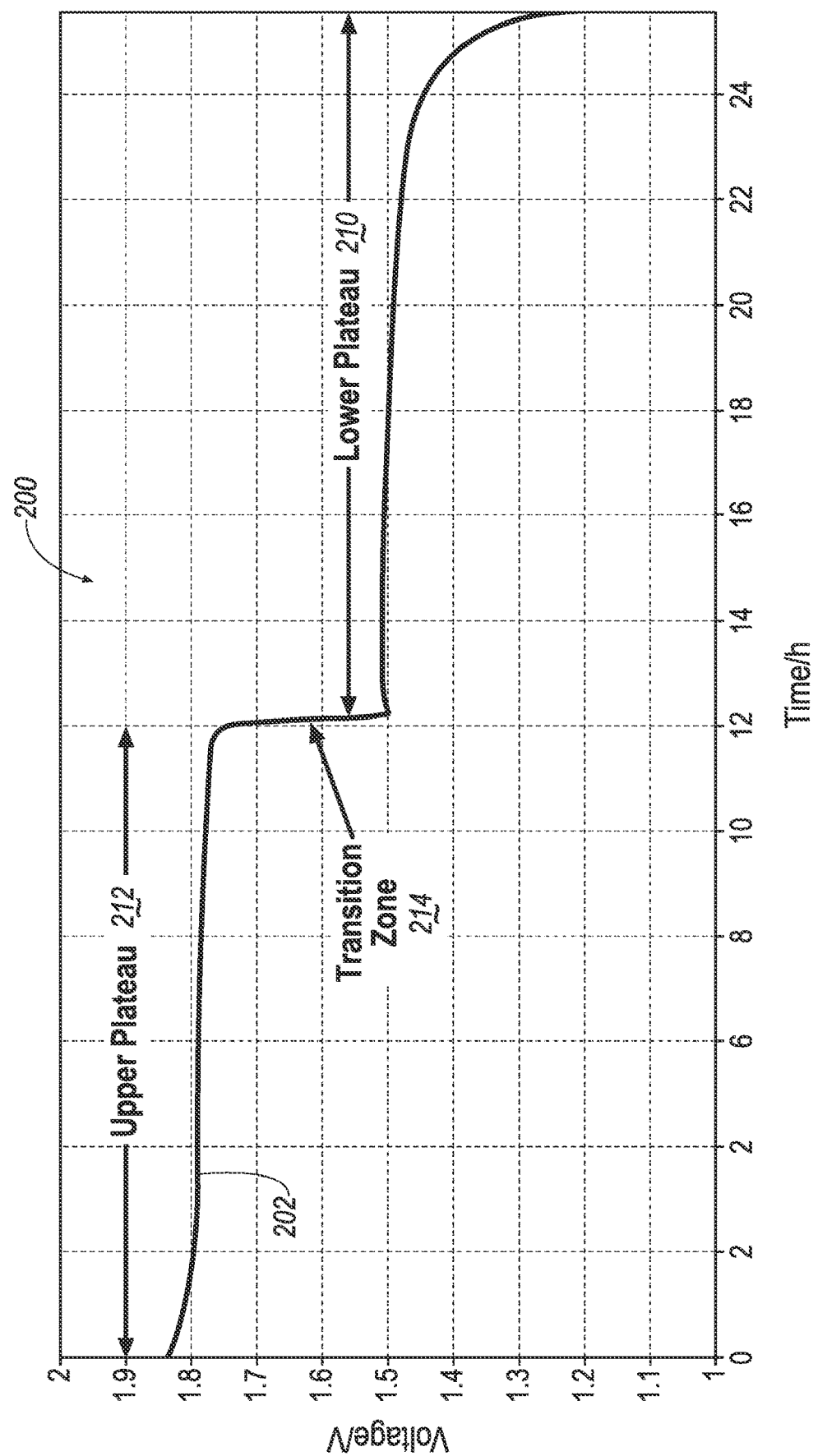
FIG. 2 shows an example plot of a discharge voltage over time for a rechargeable silver-zinc battery.

FIG. 2 shows an example plot 200 of a discharge voltage 202 over time for a rechargeable AgZn battery. The horizontal x-axis denotes time in hours (h) and the vertical y-axis denotes voltage (V). The discharge voltage 202 shows the AgZn battery 102 may discharge in a first zone 210 corresponding to a lower voltage plateau or may discharge in a second zone 212 corresponding to an upper voltage plateau, depending on the state of charge or open circuit voltage of the battery when discharging starts. A transition zone 214 corresponds to a region between the first and second zones 210, 212, respectively. Accordingly, from a full charge with an open circuit voltage (OCV) of about 1.86 V, the discharge voltage 202 shows the AgZn battery discharging in the second zone 212 for about 12 hours until falling to about 1.5 V and discharging in the first zone 210 from about 12 hours to about 24 hours before depleting.

The upper plateau 212 refers to the higher discharge voltage when the silver-zinc cell is primarily the higher valence level of silver-oxide (silver II oxide or AgO). The average voltage is typically around 1.8 V in the upper plateau 212 but can vary based on the load current. The lower plateau 210 refers to the lower discharge voltage when the silver-zinc cell is primarily the lower valence level of silver-oxide (silver I oxide or $Ag_2O$). The average voltage is typically around 1.5 V in the lower plateau 210 but this can vary based on the load current. On discharge, the transition zone 214 in the knee (i.e., inflection point) in the voltage curve where the cell voltage drops from the higher valence state of silver-oxide to the lower valence stage of silver-oxide. The transition zone 214 is the highest impedance period of the discharge cycle. The time period of the transition zone 214 is very short and determined by discharge rate.

In some implementations, the charging device 120 executes one of a first or second charging strategy during a charging session to charge the battery 102 based upon what zone (e.g., first zone 210 or second zone 212) the battery 102 (e.g., a single battery or two batteries in series) was last discharging in just prior to when the charging session begins. For instance, the first charging strategy is used when the OCV ($V_{batt}$) of the battery 102 prior to charging is less than or equal to a voltage threshold and the second charging strategy is used when the OCV of the battery 102 prior to charging is greater than the voltage threshold. As used herein, the OCV corresponds to the open cell voltage per battery cell, and therefore, when the battery 102 comprises two batteries in series, each of the two batteries corresponds to a respective cell. In some examples, the voltage threshold is 1.7 V (e.g., 1.7 V/cell), where values of 1.7 V or less correspond to the battery discharging in the first zone 210 and values greater than 1.7 V correspond to the battery 102 discharging in the second zone 212. The battery 102 may be indicative of being discharged to a low state of charge, e.g., less than 50%, when the OCV ($V_{batt}$) of the battery 102 prior to charging is less than the voltage threshold. The battery 102 may be indicative of having a higher state of charge, e.g., greater than 50%, when the OCV ($V_{batt}$) of the battery 102 prior to charging is greater than the voltage threshold.

Figure 3:
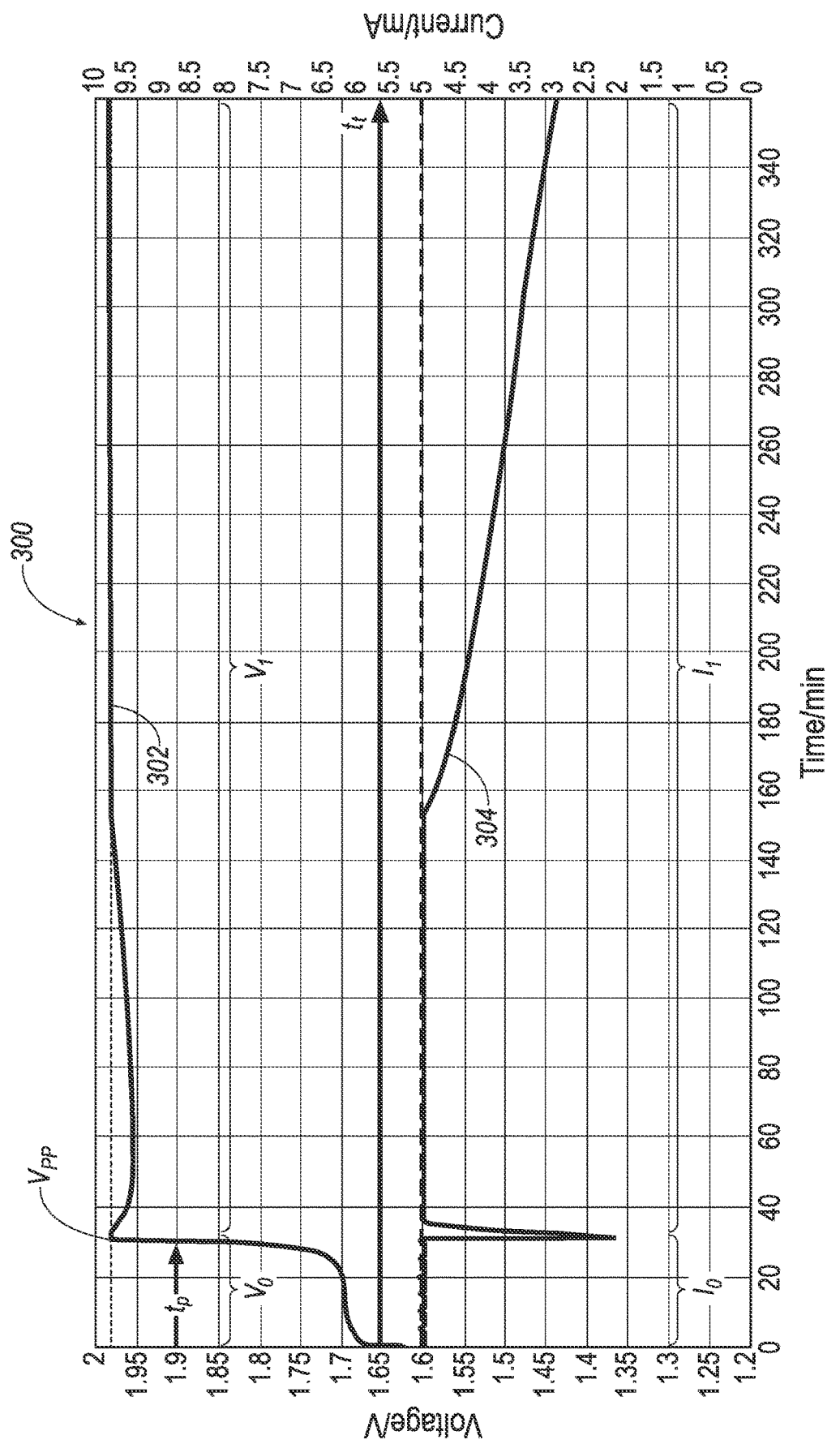
FIG. 3 shows an example plot of constant current and constant voltage charge curves over time, illustrating a polarization peak during charge.

Referring to FIG. 3, an example plot 300 shows the battery voltage ($V_{batt}$) (shown as $V_0$ and $V_1$) 302 (e.g., $V_{batt}$ per cell when two cells are in series) and a battery current (shown as $I_0$, $I_1$) 304 when the first charging strategy is used to charge the battery from the first zone 210. The horizontal x-axis denotes time in hours (h), the left-side vertical y-axis denotes voltage (V) and the right-side vertical y-axis denotes current (mA). A full charge of the silver-zinc cell requires the transition from the lower valence stage of silver oxide to the higher valence stage of silver oxide. This transition is the highest impedance period of the charge cycle and is referred to as the polarization peak, $V_{pp}$. During this period in a CC-CV (constant current-constant voltage) charge algorithm, the charge voltage will be at its maximum and the charge current will drop very quickly and then quickly recover to the maximum charge current level. This time period is very short, typically less than three minutes. The first charging strategy initiates the timer and begins charging the battery 102 at 0 min from the OCV settling voltage for a deeply discharged battery. In this example, the charger charges that battery 102 at a charge current of 5.0 mA and a temperature-independent charge voltage of 1.98 V. Alternatively, the charge voltage may be 2.0 V. The horizontal dashed lines show the constant charge voltage and constant charge current.

In some examples, the $V_{PP}$ is between 1.80 V and 2.20 V (e.g., between 1.96 V and 1.98 V). In other examples, $V_{PP}$ is equal to about 1.90 V. The time to polarization is the amount of time from a starting time, e.g., initiation of the charge voltage and current, to the time when the voltage, $V_{batt}$, hits a polarization peak. A polarization peak is a spike in the voltage over a short time. Several implementations use the value of $V_{PP}$=1.90 V for obtaining the $t_p$.

The constant current and constant voltage charge curves are shown over time. The constant voltage is set to 1.98 V and eventually plateaus at this voltage after a period of time. The constant current is set to 5.5 mA and remains at this current (other than a quick spike during polarization) until the voltage reaches the constant voltage, when it starts to decrease. In other implementations, the constant current is set to 5.0 mA.

A polarization timer and post-polarization timer may be used. The polarization time ($t_p$) is the time from the beginning of a charging session (e.g., t=0) until the polarization peak ($V_{pp}$) is reached. Another timer may be activated after the polarization peak is reached, i.e., a post-polarization timer (not shown). For example, a post-polarization timer may be set for a fixed period of time during which charging will not terminate even if one or more termination conditions are met.

Figure 4:
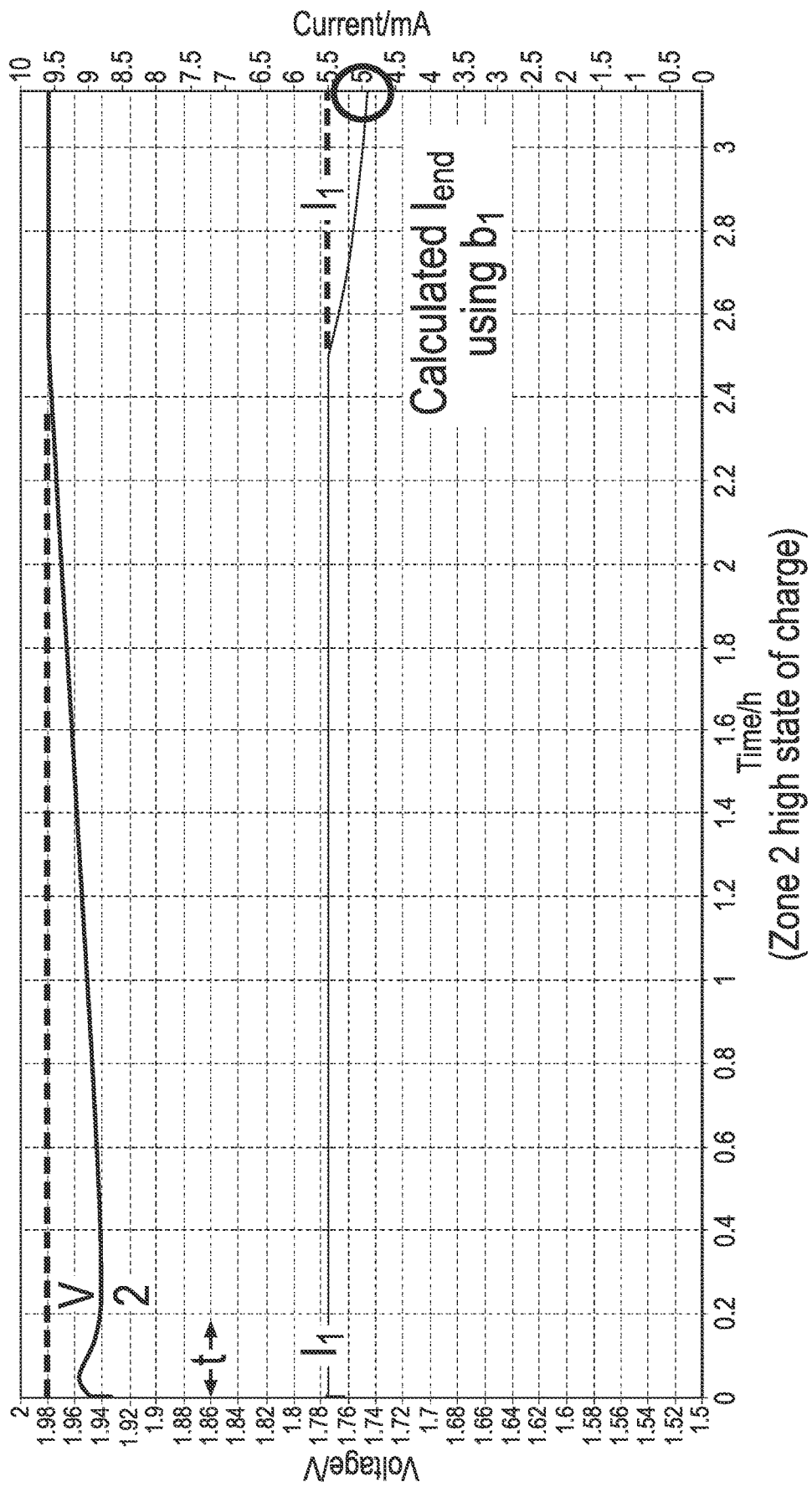
FIG. 4 shows an example charge curve in Zone 2 when beginning at a high state of charge.

Referring to FIG. 4, the chart shows charging in Zone 2 according to the second charging strategy where the initial state of charge is a high state of charge in the upper plateau 212 that is not near the transition zone 214. In this instance, the charge current is above a threshold current during an initial period of time, t. As such, the value of the termination current will be calculated using a corresponding first offset value. For example, the first offset may be used as the constant, B, in the calculation for the termination current, $I_{end}$.

Figure 5:
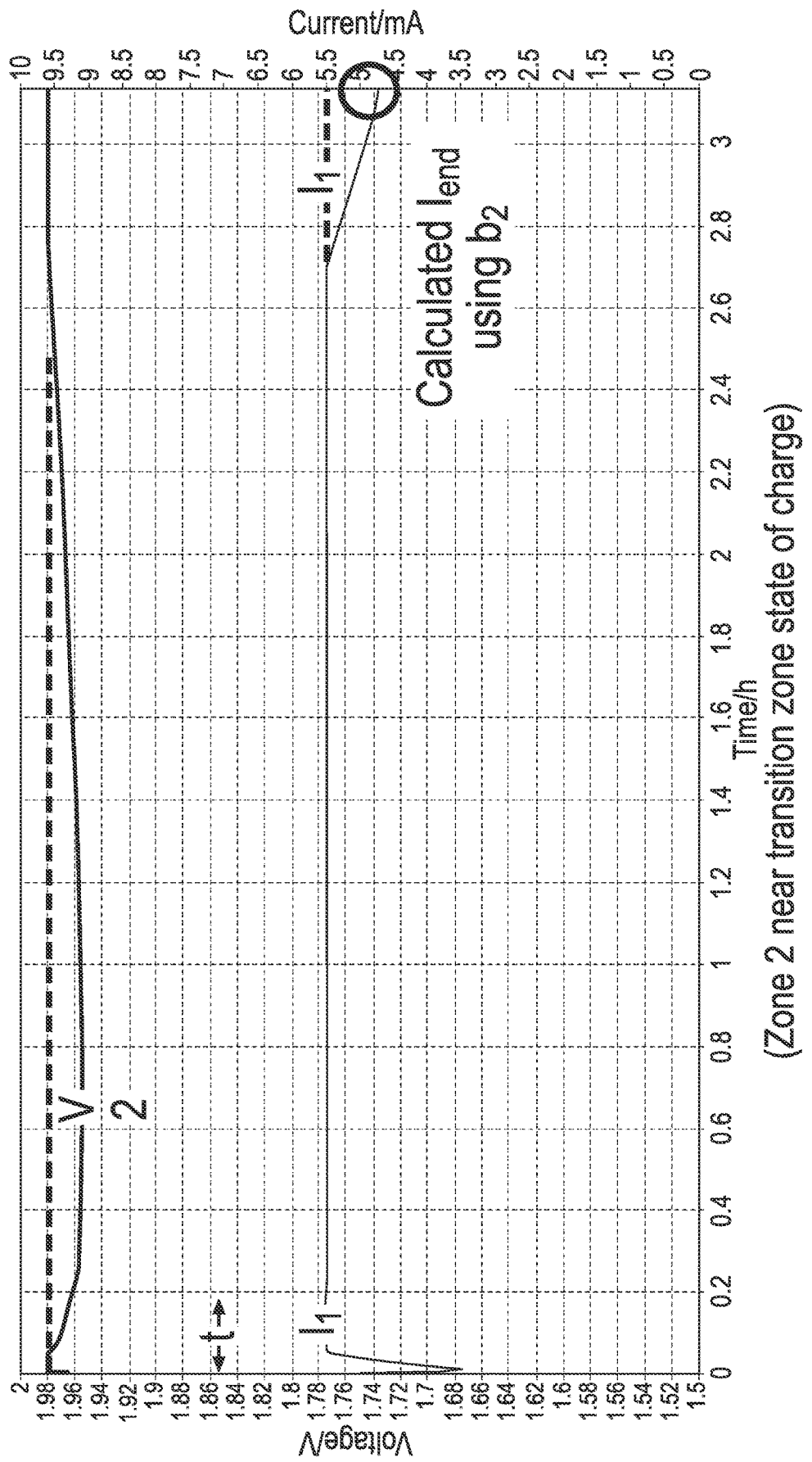
FIG. 5 shows an example charge curve in Zone 2 when beginning near the transition zone.

Referring to FIG. 5, the chart shows charging in Zone 2 according to the second charging strategy where the initial state of charge is in a high state of charge in the upper plateau 212 that is near the transition zone 214. In this instance, the charge current is not above a threshold current during the initial period of time, t. As such, the value of the termination current will be calculated using a corresponding second offset value. For example, the second offset may be used as the constant, B, in the calculation for the termination current, $I_{end}$. The constant voltage and constant current are shown as 1.98 V and 5.5 mA, respectively. Other implementations are possible, including a constant voltage of 2.0 V and constant current of 5 mA.

Figure 6:
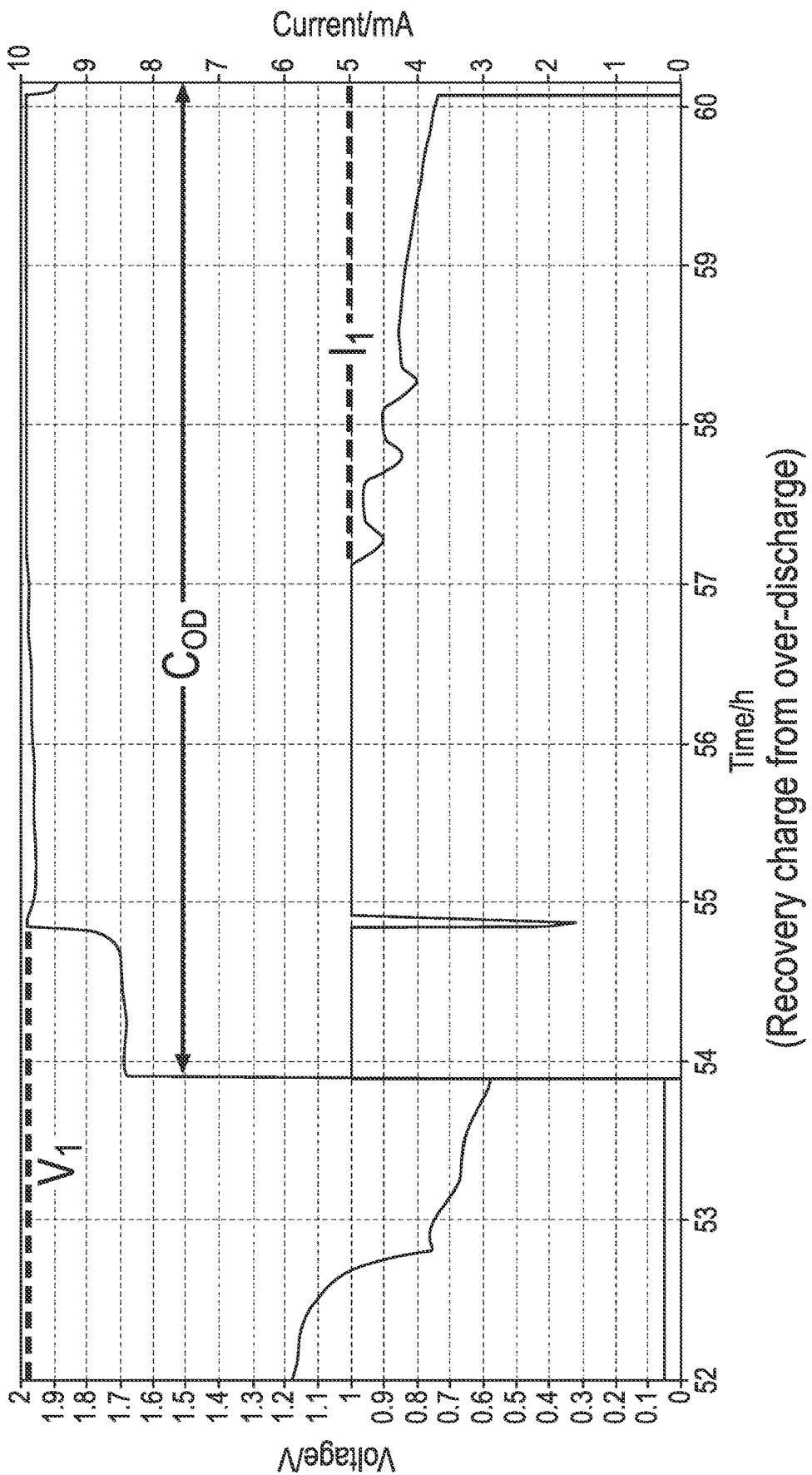
FIG. 6 shows an example charge curve for a recovery charge from over-discharge.

Referring to FIG. 6, the chart shows a recovery charge from over-discharge. Over-discharge may be detected when the OCV is less than 1.2 V. Alternatively, over-discharge may be detected when ASIC is in standby mode. The cell should be charged at a constant current and constant voltage. Charging may terminate when a maximum capacity is charged into the cell or the charge current falls below a termination current. The overall charge time is longer than a normal charge due to the slower start of charge and the different capacity target.

Figure 7:
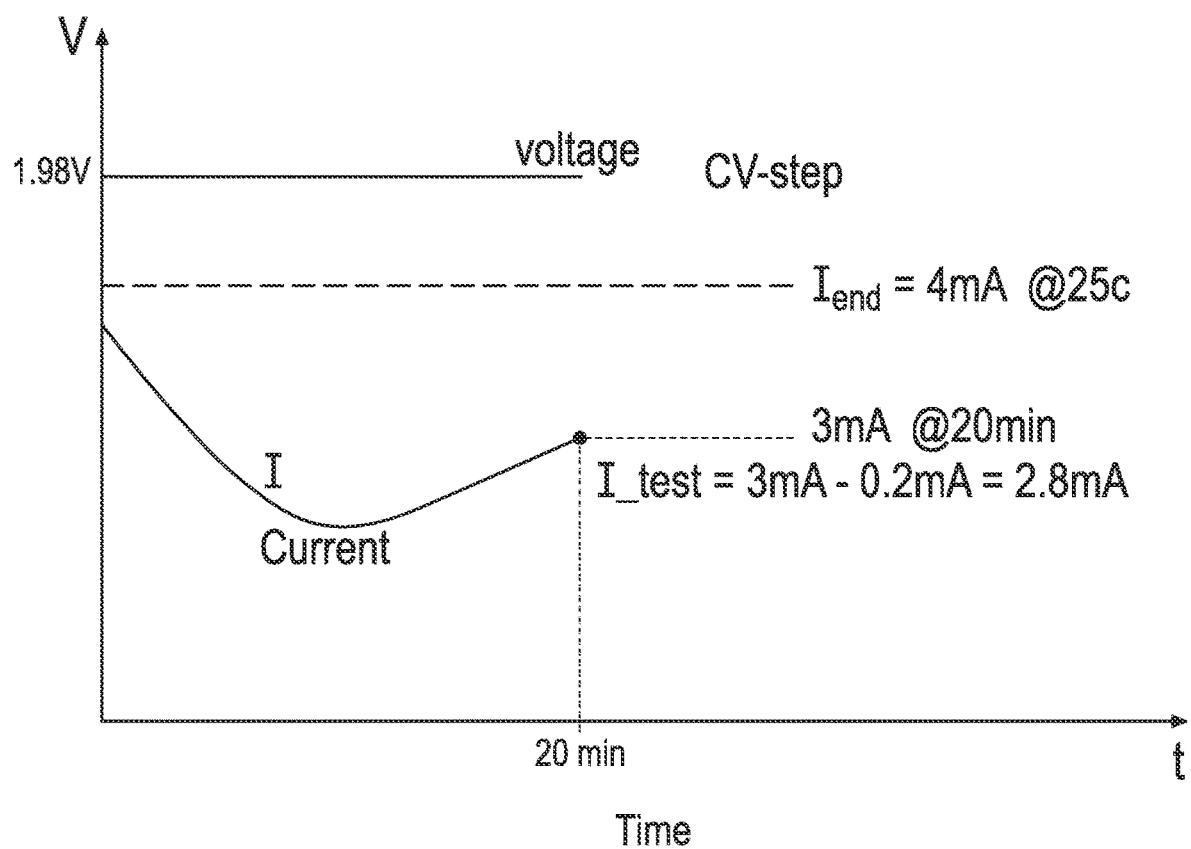
FIG. 7 shows an example charge curve during a 20 minute time period.

Referring to FIG. 7, a charging curve over a twenty minute interval is shown. The charge current decreases initially and then increases over the twenty minute interval. The voltage stays at the constant voltage during the same interval. In this example, $I_{end}$ is 2.8 mA until I=4.2 mA, then $I_{end}$ becomes 4 mA or $Q_{tgt}$.

Figure 8A:
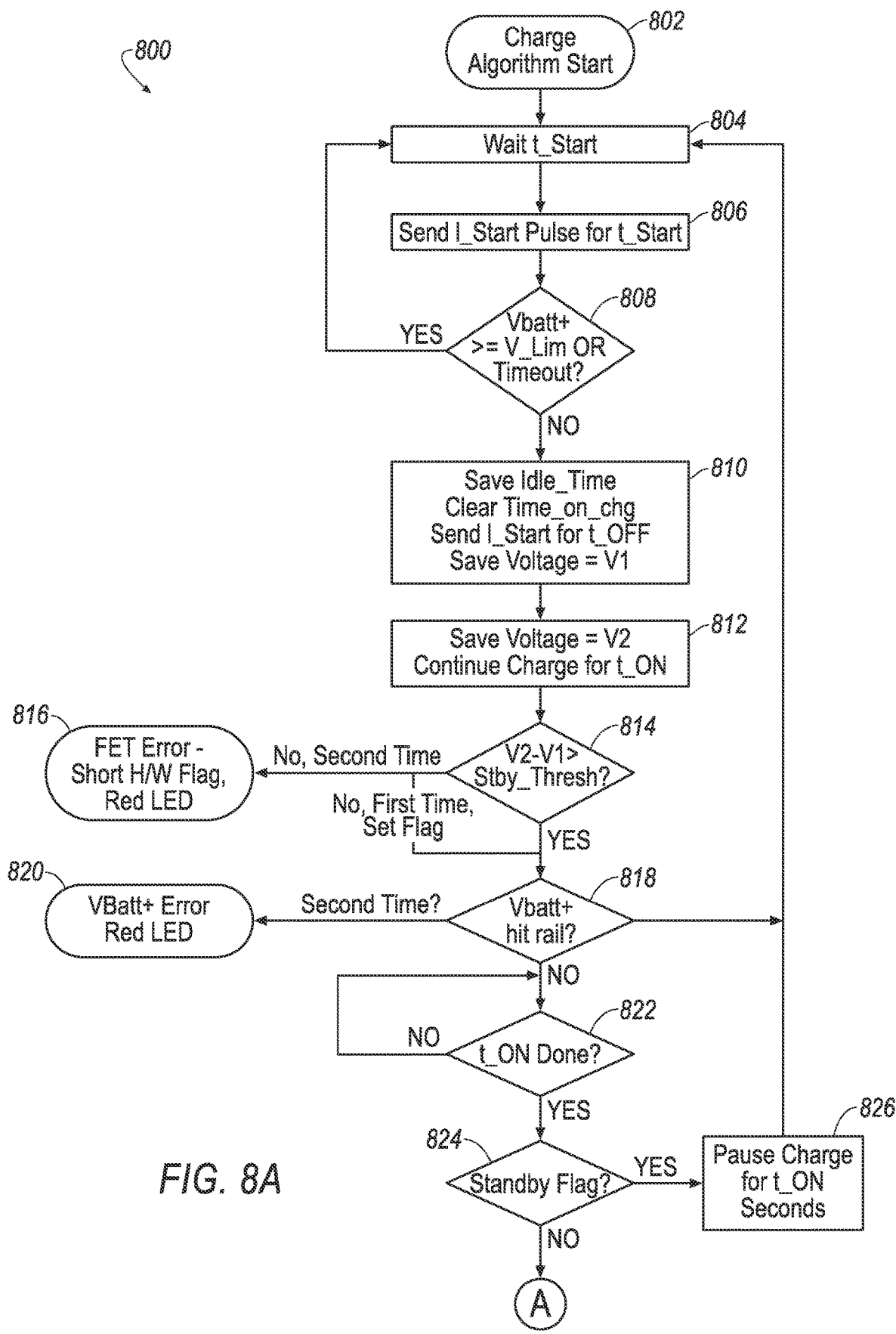
FIG. 8 provides an example flowchart for startup and detection of initial voltage/SOC and selection of charging strategy.
Figure 8B:
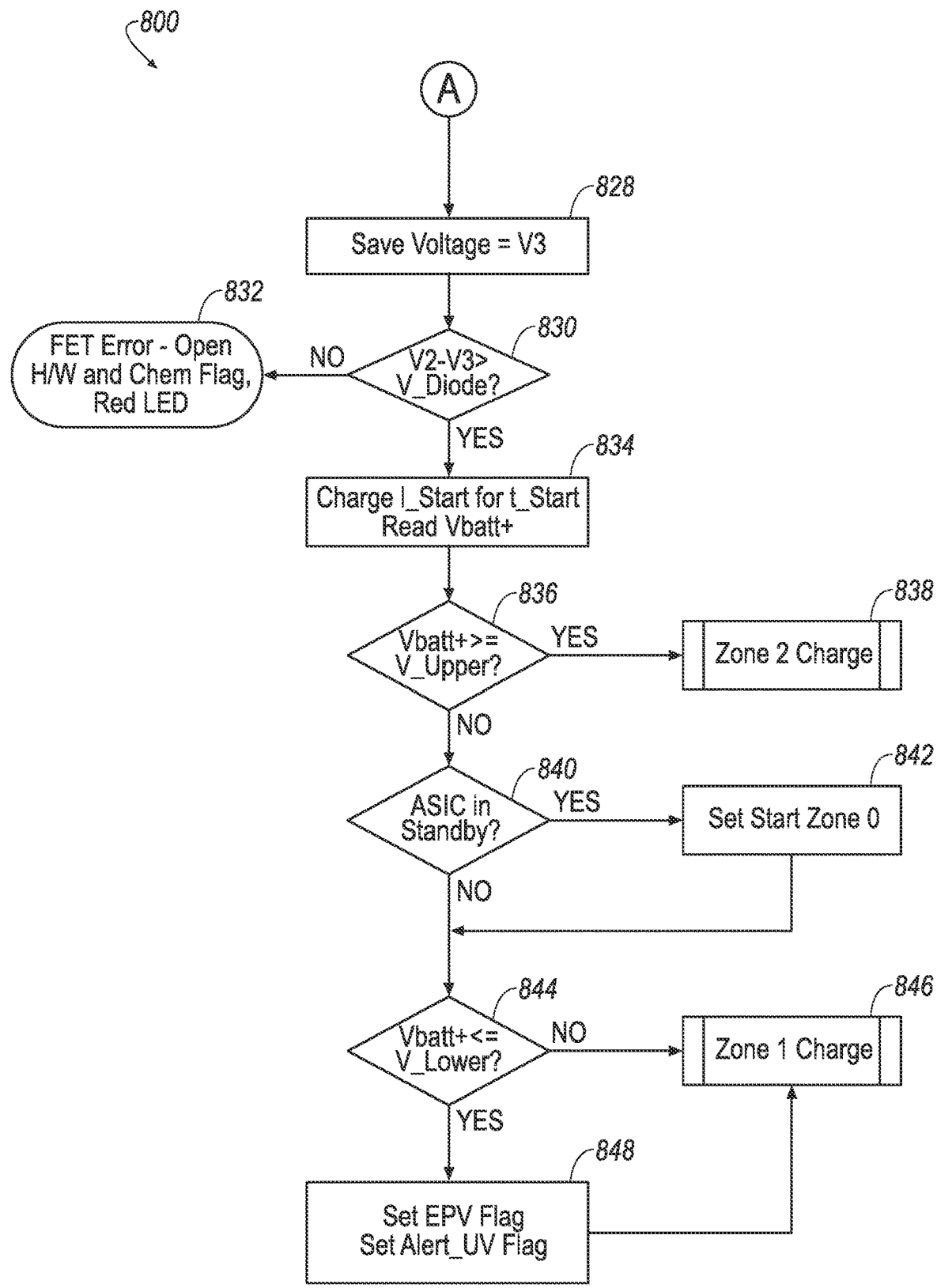
Figure 9A:
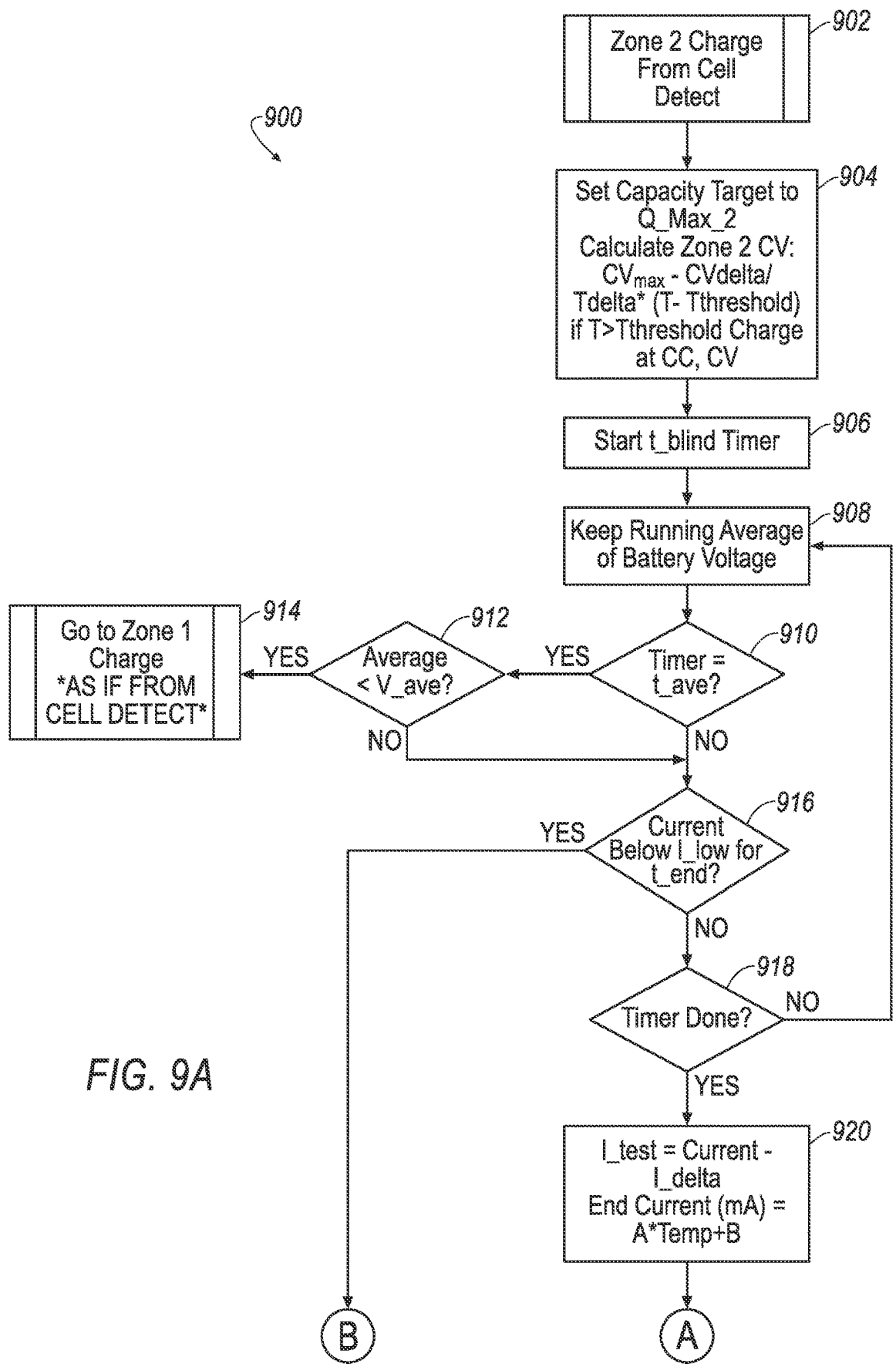
FIG. 9 provides an example flowchart for charging according to a second strategy, i.e., Zone 2.
Figure 9B:
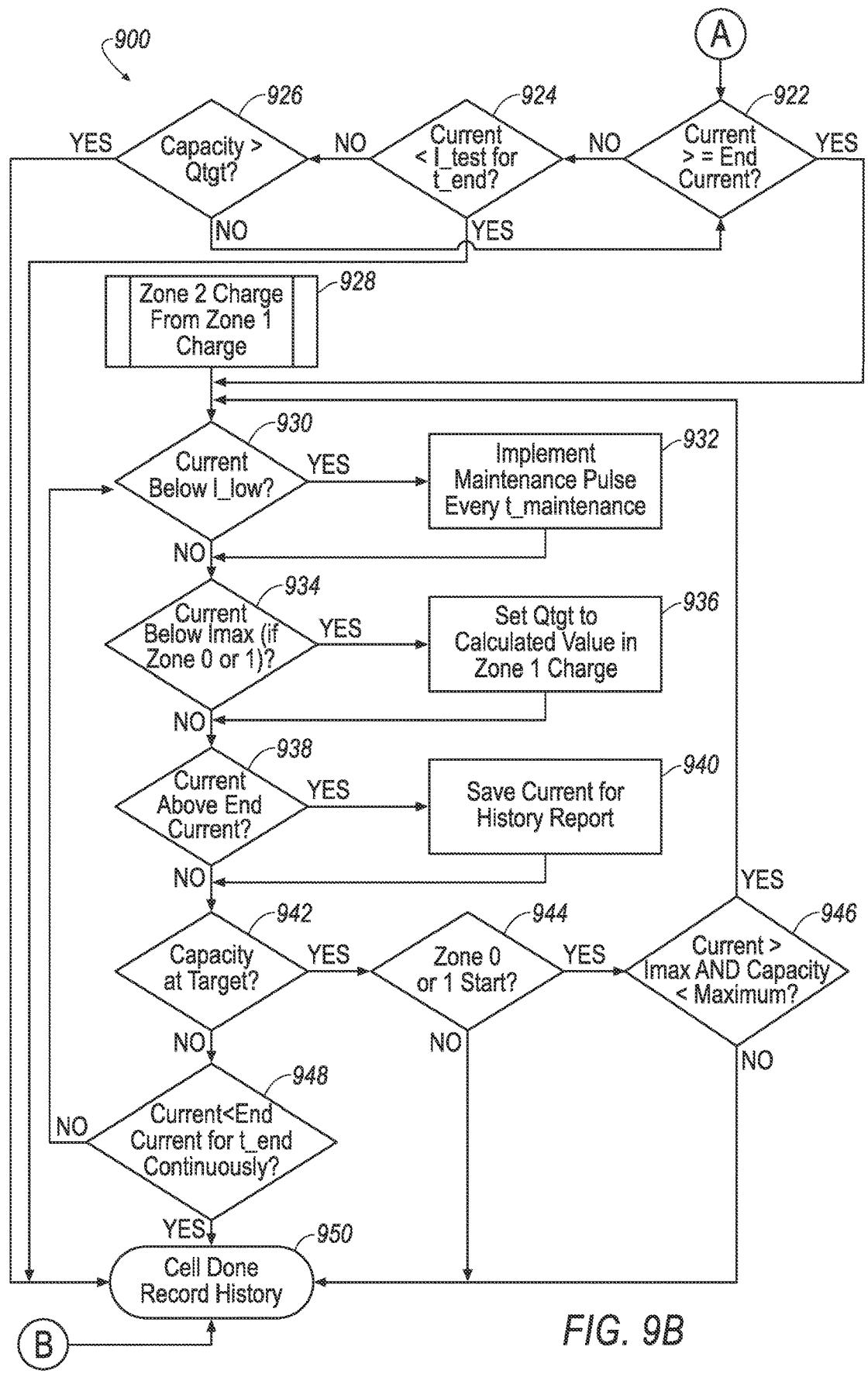
Figure 10:
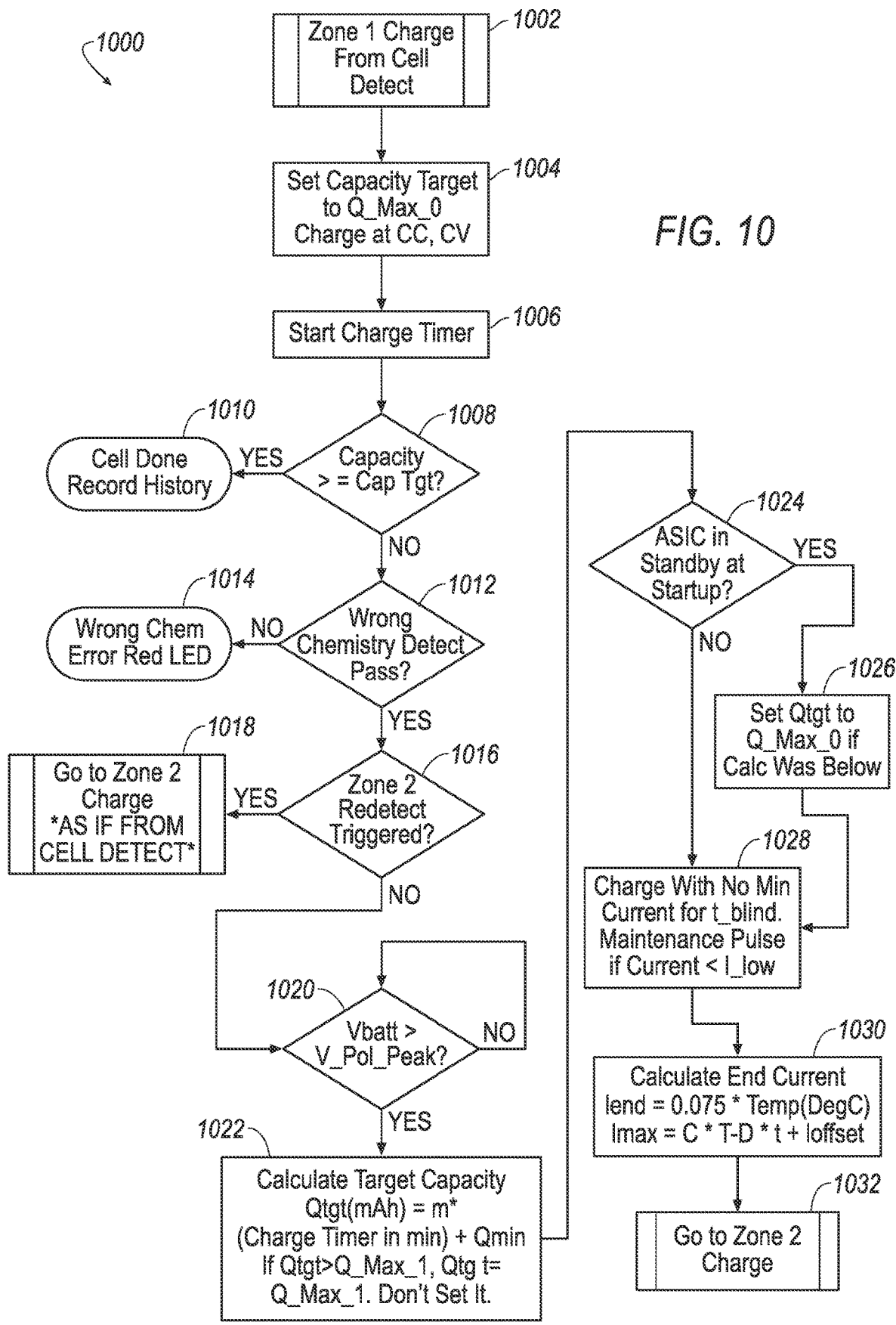
FIG. 10 provides an example flowchart for charging according to a first strategy, i.e., Zone 1.

FIGS. 8-10 provide flowcharts 800, 900, and 1000 for methods of charging a battery 102. The methods provided by the flowcharts equally apply to the charging of two or more batteries 102 in series.

Referring to FIG. 8, the flowchart 800 provides a method for initializing a charging session for charging the battery 102. The flowchart 800 starts at block 802 by initiating the charge algorithm, and at block 804, waits for time t_Start (e.g., 0.1 to 1 seconds (s)) using the timer. At block 806, the charging circuitry 120 provides an I_start pulse (e.g., 0.6 to 5 mA pulse) to the battery for t_Start, and at decision block 808, the flowchart 800 determines whether the voltage ($V_{batt}$) (labeled as Vbatt+ in FIG. 8) of the battery is greater than or equal to a voltage limit, V_Lim (e.g., 2 to 3 V). If the $V_{batt}$ is greater than or equal to V_Lim (i.e., decision block 808 is "Yes"), then the flowchart 800 repeats blocks 804-808. On the other hand, if the $V_{batt}$ is less than V_Lim (i.e., decision block 808 is "No"), then at block 810, the charging circuitry 120 resets the timer, sends I_Start pulse to the battery for t_OFF (e.g., 0.1 to 1.5 s), and measures and saves a first voltage (V1) of the battery 102. Once t_OFF has elapsed, the flowchart 800 proceeds to block 812 where the charging circuitry 120 measures and saves a second voltage (V2) of the battery 102 and continues sending the I_Start pulse to the battery 102 for t_ON (e.g., 3 to 10 s).

At decision block 814, the system determines if V2 minus V1 is greater than a voltage threshold, "Stby_thresh." If V2 minus V1 is less than or equal to the voltage threshold (i.e., decision block 814 is "No") for a first time, a flag is set and the flowchart 800 proceeds to decision block 818. If V2 minus V1 is less than or equal to the voltage threshold (i.e., decision block 814 is "No") for a second time, then at block 816, the flowchart 800 terminates the charging session and activates an error indicator. If V2 minus V1 is greater than the voltage threshold, then the flowchart 800 determines, at decision block 818, if the $V_{batt}$ hit a rail (i.e., the flowchart 800 determines if $V_{batt}$ is greater than 2.5 V). Accordingly, if decision block 818 is "Yes" for the first time, the flowchart 800 reverts back to block 804. However, if decision block 818 is "Yes" for a second time, then at block 820, the flowchart 800 terminates the charging session and activates an error indicator. On the other hand, if decision block is "No", then the flowchart 800 proceeds to block 822, and waits for t_ON, before proceeding to decision block 824.

At decision block 824, the flowchart 800 determines whether or not a standby flag exists. If a standby flag exists (i.e., decision block 824 is "Yes", then the flowchart 800 proceeds to block 826, and pauses the charging session for t_ON before reverting back to block 804. On the other hand, if a standby flag does not exist (i.e., decision block 824 is "No"), then the flowchart 800 proceeds to block 828, whereby the charging circuitry 120 measures and saves a third voltage (V3) of the battery 102. At decision block 830, the flowchart determines whether or not V2 minus V3 is greater than a voltage threshold, $V_{diode}$. If the value of V2 minus V3 is less than or equal to $V_{diode}$ (i.e., decision block 830 is "No"), then at block 832, the flowchart 800 terminates the charging session and activates an error indicator. This error indicator may indicate that there is a battery chemistry error. For instance, the error indicator may indicate that the battery chemistry associated with the battery 102 is not intended for use with the system 100.

On the other hand, if the value of V2 minus V3 is greater than $V_{diode}$ (i.e., decision block 830 is "Yes"), then at block 834, the charging circuitry 120 charges the battery 102 at I_start for t_start and measures the battery voltage, $V_{batt}$. At decision block 836, the flowchart 800 determines if the $V_{batt}$ measured after charging the battery 102 at I_start for t_start is greater than or equal to a voltage threshold, V_Upper (e.g., 1.5 to 1.8 V). If the $V_{batt}$ is at least V_Upper (i.e., decision block 836 is "Yes"), then the battery 102 is indicative of being discharged in the second zone 212, and at block 838, the charging circuitry 120 charges the battery 102 by the second charging strategy. If, however, the $V_{batt}$ is less than V_Upper (i.e., decision block 836 is "No"), then the battery 102 is indicative of being discharged in the first zone 210. Decision block 840 determines whether the charging circuitry 120 is in standby, and if so, sets a starting zone to zero at block 842 before proceeding to decision block 844. The voltage threshold, V_Upper is in the transition zone 214 of plot 200 (FIG. 2) of the voltage discharge profile of an AgZn battery. Other voltages within the transition zone 214 may also be suitable as a voltage threshold. The voltage threshold V_Upper may be used as an estimate of state of charge (SOC) for the battery 102. Other measurements may be used to estimate the state of charge (SOC). At decision block 844, the flowchart 800 determines whether or not $V_{batt}$ is less than or equal to a lower voltage limit of V_Lower (e.g., 1 to 1.5 V). If $V_{batt}$ is less than or equal to V_Lower (i.e., decision block 844 is "Yes"), then an EPV flag and an alert flag are set at block 848 before the flowchart 800 proceeds to block 846. Conversely, if the $V_{batt}$ is greater than V_Lower (i.e., decision block 844 is "No"), then the flowchart proceeds to block 846, whereby the charging circuitry 120 charges the battery 102 by the first charging strategy.

Referring to FIG. 9, the flowchart 900 provides a method for charging the battery 102 according to the second charging strategy, i.e., Zone 2. At block 902, the charging circuitry 120 initiates charging of the battery 102 according to the second charging strategy when decision block 836 of FIG. 8 determines that the $V_{batt}$ is greater than the voltage threshold of V_Upper, thereby indicating that the battery 102 is indicative of being discharged in the second zone 212. At block 904, the flowchart 900 sets a capacity target for the battery 102, calculates the temperature-dependent constant charge voltage ($CV_T$) (labeled as "CV" in FIG. 9) using Equation (1), and the charging circuitry 120 charges the battery 102 using a constant current (e.g., 5 mA) and the calculated $C_{VT}$. For example, the capacity target could be set to 15 to 25 mAh. When the battery 102 corresponds to an AgZn battery, Equation (1) may use the following values: $CV_{max}$=1.98 V; $CV_{min}$=1.95 V (i.e., CVdelta=0.03, or in other embodiments, e.g., 0 to 1 V); $T_{max}$=40° C.; $T_{threshold}$=27° C. (i.e., Tdelta=13, or in other embodiments, e.g., 5 to 20). Accordingly, the $CV_T$ may range from 1.95 V to 1.98 V across a temperature range from 27 to 40° C. When the environmental temperature $T_E$ (labeled as "T" in FIG. 9) is less than the $T_{threshold}$ (e.g., less than 27° C.), $CV_T$ is set to $CV_{max}$ (e.g., 1.98 V). That is, the $CV_T$ is bounded by the $CV_{max}$ for temperatures below the $T_{threshold}$. When the environmental temperature $T_E$ exceeds the $T_{max}$, the battery 102 should not be charged and the temperature sensor 160 may activate an error indicator or alarm.

At block 906, the flowchart 900 starts a timer, t_blind (e.g., a 10 to 40 minute timer), and at block 908 calculates a running average of the battery voltage during the timer. At decision block 910, the flowchart determines when the timer is equal to t_ave (e.g., 5 to 15 minutes). When the timer is equal to t_ave (i.e., decision block 910 is "Yes"), then the flowchart 900 determines if the average of the battery voltage is less than V_ave (e.g., 1.6 to 1.9 V). If the average of the battery voltage is less than V_ave (i.e., decision block 912 is "Yes"), then at block 914, the flowchart 900 proceeds to block 1002 of FIG. 10 to charge the battery 102 according to the first charging strategy. Accordingly, when the average of the battery voltage is less than V_ave after timer reaches t_ave (e.g., after 5 to 15 minutes of charging at the constant current and the constant charge voltage $CV_T$), then the flowchart 900 determines that the battery 102 should instead charge according to the first charging strategy.

If, however, the average of the battery voltage is greater than or equal to V_ave (i.e., decision block 912 is "No"), then at decision block 916, the flowchart 900 determines if the charge current is below I_low (e.g., 0.5 to 1.5 mA) for time, t_end (e.g., 15 seconds to 2 minutes). If the charge current is below I_low for t_end (i.e., decision block 916 is "Yes"), then the battery 102 is indicative of being charged and the flowchart 900 proceeds to block 950 and terminates the charging session. On the other hand, if the charge current is not below I_low for t_end (i.e., decision block 916 is "No"), then the flowchart 900 proceeds to block 918 to determine whether or not the timer t_blind set at block 906 has ended. When the timer has ended, the flowchart 900 proceeds to block 920. Otherwise, the flowchart 900 reverts back to block 908. At block 920, the flowchart 900 calculates a test current $I_{test}$ and the "end" termination current $I_{end}$ (labeled as "End Current" in FIG. 9). The test current $I_{test}$ may be calculated by subtracting I_delta (e.g., 0 to 1 mA) from the charge current and the "end" termination current $I_{end}$ may be calculated using Equation (2). The value of the test current $I_{test}$ may be used to determine if the charge current is decreasing.

As charging at $CV_T$ continues, decision block 922 determines if the charge current is greater than or equal to the "end" termination current, $I_{end}$. If the charge current is below the termination current, $I_{end}$, (i.e., if decision block 922 is "No"), then at decision block 924 the flowchart determines if the charge current is decreasing, i.e., whether the charge current is less than $I_{test}$ for t_end. If the charge current is decreasing (i.e., if decision block 924 is "Yes"), then the charging terminates at block 950. If the charge current is not decreasing (i.e., if decision block 924 is "No"), then at decision block 926, the flowchart determines if the battery capacity is greater than the target capacity. If the battery capacity is greater than the target capacity (i.e., if decision block 926 is "Yes"), then charging terminates at block 950. If the battery capacity is less than the target capacity (i.e., if decision block 926 is "No"), then the flowchart reverts back to decision block 922. If at decision block 922, the charge current is above the termination current, $I_{end}$, (i.e., if decision block 922 is "Yes") then the flowchart proceeds to decision block 930.

At decision block 930, the flowchart determines if the charge current is below I_low. If the charge current is below I_low (i.e., if decision block 930 is "Yes"), then a maintenance pulse is implemented at block 932. The flowchart next proceeds to decision block 934. Decision block 934 will apply to a charging session where the charging session entered Zone 2 from block 928, i.e., the charging session had previously charged the battery in Zone 1. Otherwise decision block 934 is ignored. At decision block 934, if the current is below a "max" termination current, $I_{max}$, (i.e., if decision block 934 is "Yes"), then at block 936 a capacity target, $Q_{tgt}$, is set from the $Q_{tgt}$ value calculated in Zone 1. The flowchart next proceeds to decision block 938. At decision block 938, the flowchart determines if the charge current is above the "end" termination current, $I_{end}$. If the charge current is above the "end" termination current, $I_{end}$, (i.e., if decision block 938 is "Yes"), then the current is saved for a history report at block 940. The flowchart next proceeds to decision block 942. At decision block 942, the flowchart determines if the battery capacity is at the target capacity.

If the battery capacity is not at the target capacity (i.e., if decision block 942 is "No"), then the flowchart proceeds to decision block 948. At decision block 948 the flowchart determines if the charge current is less than the termination current, $I_{end}$, for t_end continuously. If the charge current has been less than the termination current, $I_{end}$ for t_end continuously (i.e., if decision block 948 is "Yes"), then charging terminates at block 950. If the charge current is not less than the termination current, $I_{end}$, for t_end continuously (i.e., decision block 948 is "No"), then the flowchart reverts to block 930.

If at block 942, the battery capacity is at the target capacity (i.e., decision block 942 is "Yes"), then the flowchart proceeds to decision block 944. At decision block 944, if the charging session did not start in Zone 0 or Zone 1 (i.e., if decision block 944 is "No"), then charging terminates at block 950. At decision block 944, if the charging session did start in Zone 0 or Zone 1 (i.e., if decision block 944 is "Yes"), then the flowchart proceeds to decision block 946. At decision block 946, the flowchart determines if the current is greater than the "max" termination current, $I_{max}$, and if the battery capacity is less than the maximum capacity, $Q_{max}$, each of which ($I_{max}$ and $Q_{max}$) were calculated in Zone 1. If the charge current is greater than $I_{max}$ and battery capacity is less than $Q_{max}$ (i.e., if decision block 946 is "Yes"), then the flowchart reverts to decision block 930. If the charge current is less than $I_{max}$ or the battery capacity is greater than $Q_{max}$ (i.e., if decision block 946 is "No"), then charging terminates at block 950.

Referring to FIG. 10, the flowchart 1000 provides a method for charging the battery 102 according to the first charging strategy, i.e., Zone 1. At block 1004, the charging circuitry 120 initiates charging of the battery 102 according to the first charging strategy when decision block 836 of FIG. 8 determines that the $V_{batt}$ is less than the voltage threshold of V_Upper, thereby indicating that the battery 102 is indicative of being discharged in the first zone 210. At block 1004, the flowchart 1000 sets a capacity target (Q_max_0, e.g., 28 mAh to 40 mAh) for the battery 102, and charges the battery using a temperature-independent constant charge voltage ($CV_{XT}$) (e.g., 2 V) (labeled as "CV" in FIG. 10) and constant charge current (e.g., 5 mA). At block 1006 a charge timer is started. At decision block 1008, the flowchart determines the battery capacity. If the battery capacity is greater than or equal to the target capacity (i.e., if decision block 1008 is "Yes"), then the charging session is terminated at block 1010. Otherwise (i.e., if decision block 1008 is "No"), the flowchart proceeds to decision block 1012.

At decision block 1012, the flowchart determines whether the battery has the correct battery chemistry. For example, the battery may be charged and the battery voltage determined and if the battery voltage remains below 1.6 V after 30 minutes, a battery chemistry error may be detected and charging terminated. Continuing the example, if the battery voltage reaches 1.7 V, the charging may be paused for 2 minutes with a maintenance pulse delivered to relax the battery voltage; after the 2 minutes, if battery voltage is greater than 1.7 V, charging may switch to Zone 2, if battery voltage is less than 1.5 V, charging may terminate due to a chemistry error, and if battery voltage is between 1.5 and 1.7 V, then charging in Zone 1 may continue. In general, if a chemistry error is detected at decision block 1012, the flowchart proceeds to block 1014 and charging is terminated and a chemistry error alert is activated. If no chemistry error is detected, then the flowchart proceeds to decision block 1016.

At decision block 1016 a Zone 2 redetect is performed and the flowchart determines whether the Zone 2 redetect is triggered. The Zone 2 redetect comprises redetecting battery voltage ($V_{batt}$) and changing to the second charging strategy if $V_{batt}$ is above a threshold voltage. Thus, if $V_{batt}$ is above a threshold voltage at decision block 1016, Zone 2 redetect is triggered (i.e., decision block 1016 is "No") and the flowchart proceeds to block 1018. Conversely, if $V_{batt}$ is below the threshold voltage at decision block 1016, then the flowchart proceeds to block 1020.

At decision block 1020, the flowchart determines $V_{batt}$. If $V_{batt}$ is greater than $V_{PP}$ (labeled as V_Pol_Peak in FIG. 10) (e.g., 1.95 to 2.1 V) (i.e., if decision block 1020 is "Yes"), then the flowchart proceeds to block 1022. If $V_{batt}$ is less than or equal to $V_{PP}$ (i.e., if decision block 1020 is "No") then the flowchart repeats decision block 1020. At block 1022, the flowchart calculates a target capacity according to equation (4). Inserting values for the constants in equation (4), in one example, the equation may be expressed as $Q_{tgt}=0.31*t_p+17.2$. In one example, m=0.25 to 0.42 mAh/min and Qmin=15 to 25 mAh. $Q_{tgt}$ may also be bounded at a maximum value, Q_max_1 (e.g., 28 to 40 mAh). The flowchart next proceeds to decision block 1024. At decision block 1024, the flowchart determines if ASIC was in standby at startup. The information is communicated by the ASIC, which is in communication, e.g., via the charging circuitry. If ASIC was in standby at startup (i.e., if decision block 1024 is "Yes"), then at block 1026, $Q_{tgt}$ is reset to Q_Max_0 if the calculation from block 1022 was below Q_max_1 and then the flowchart proceeds to block 1028. If ASIC was not in standby at startup (i.e., if decision block 1026 is "No"), then the flowchart proceeds to block 1028 bypassing block 1026 and maintaining the same $Q_{tgt}$ value from block 1022. At block 1028 the flowchart charges the battery 102 with no minimum current condition for t_blind (e.g., 10 to 40 minutes) at the same temperature-independent constant charge voltage ($CV_{XT}$) and constant charge current. Upon completion of t_blind the flowchart proceeds to block 1030. During t_blind, if current is less than I_low, then a maintenance pulse is used.

At block 1030, the flowchart calculates an "end" termination current, $I_{end}$, and a "max" termination current, $I_{max}$. $I_{end}$ is calculated according to equation (2) and $I_{max}$ is calculated according to equation (3). For a silver-zinc battery, A may be 0.075, B may be 0, C may be 0.12 (e.g., 0.06 to 0.4) and $I_{offset}$ may be 2 (e.g., 1 to 3 mA). $D(SOC_0)$ may be calculated according to the time to polarization, in which case the term $t_p/40$ may be inserted for $D(SOC_0)$. In some implementations, D is from 0.015 to 0.04 mA/min. With the constants in the example provided, Equation (2) may be expressed as $I_{end}=0.075*T_E$ and Equation (3) may be expressed as $I_{max}=0.12*T_E-t_p/40+2$. The time to polarization ($t_p$) in this expression of Equation (3) is used as a measure of the state of charge of the battery. After the calculations are made at block 1030, the flowchart proceeds to block 1032 and the remainder of the charging session is performed according to the second charging strategy beginning at block 928 of the flowchart 900 (FIG. 9).

Figure 11A:
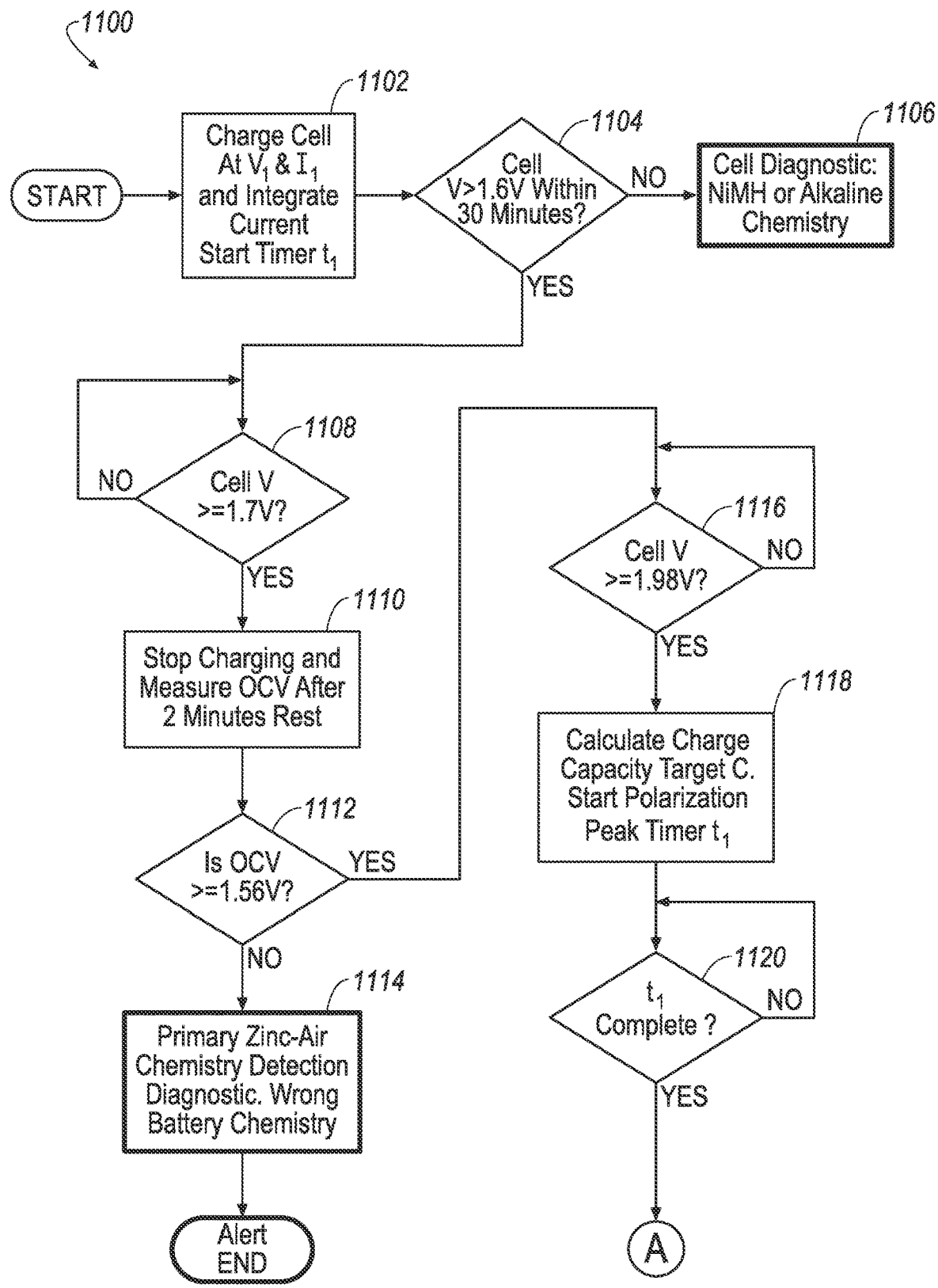
FIG. 11 provides another embodiment of a flowchart for an over-discharge recovery algorithm.
Figure 11B:
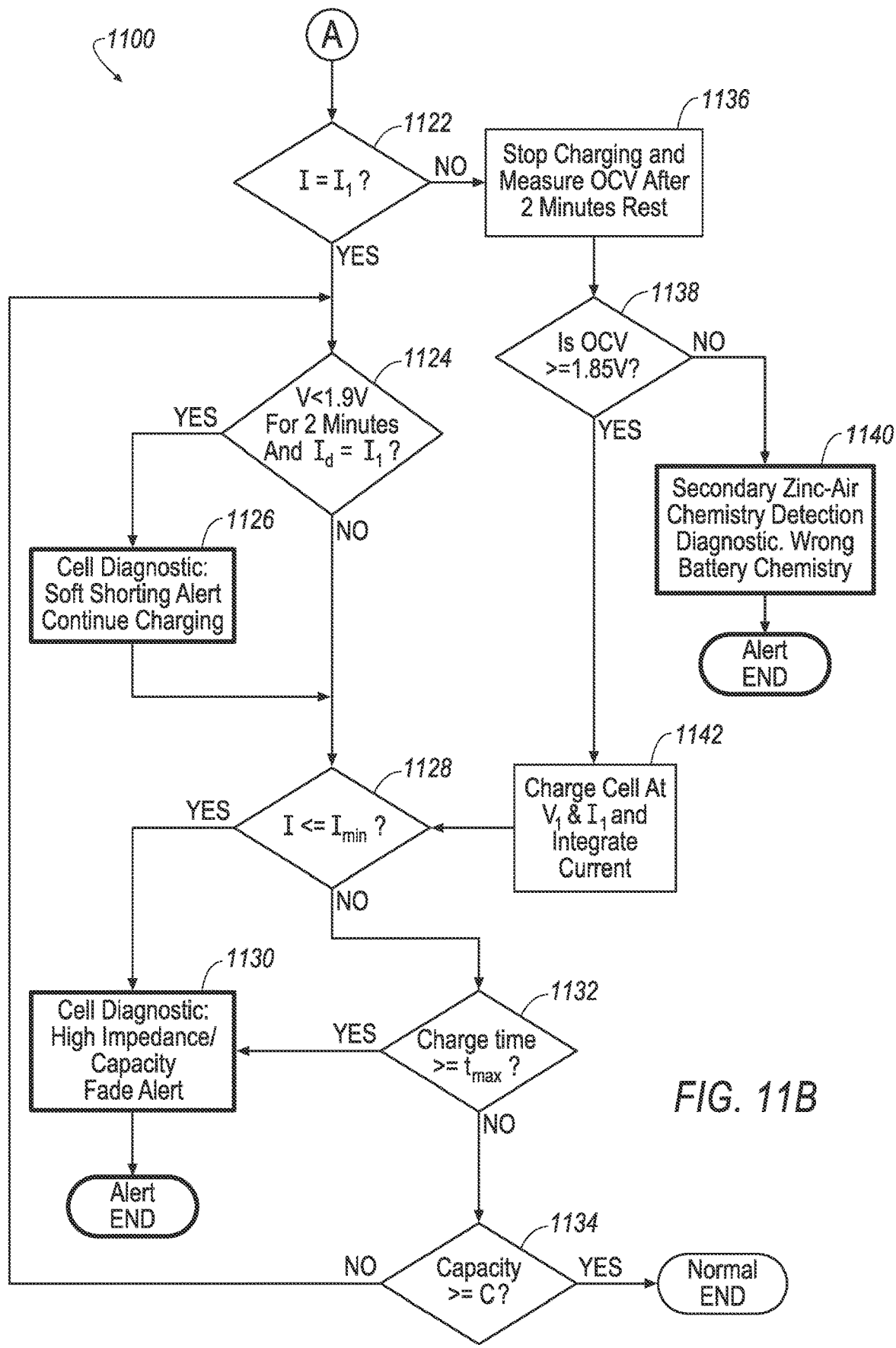

Referring to FIG. 11 an over-discharge recovery algorithm is shown. This is an alternative example method for over-discharged batteries.

Figure 12A:
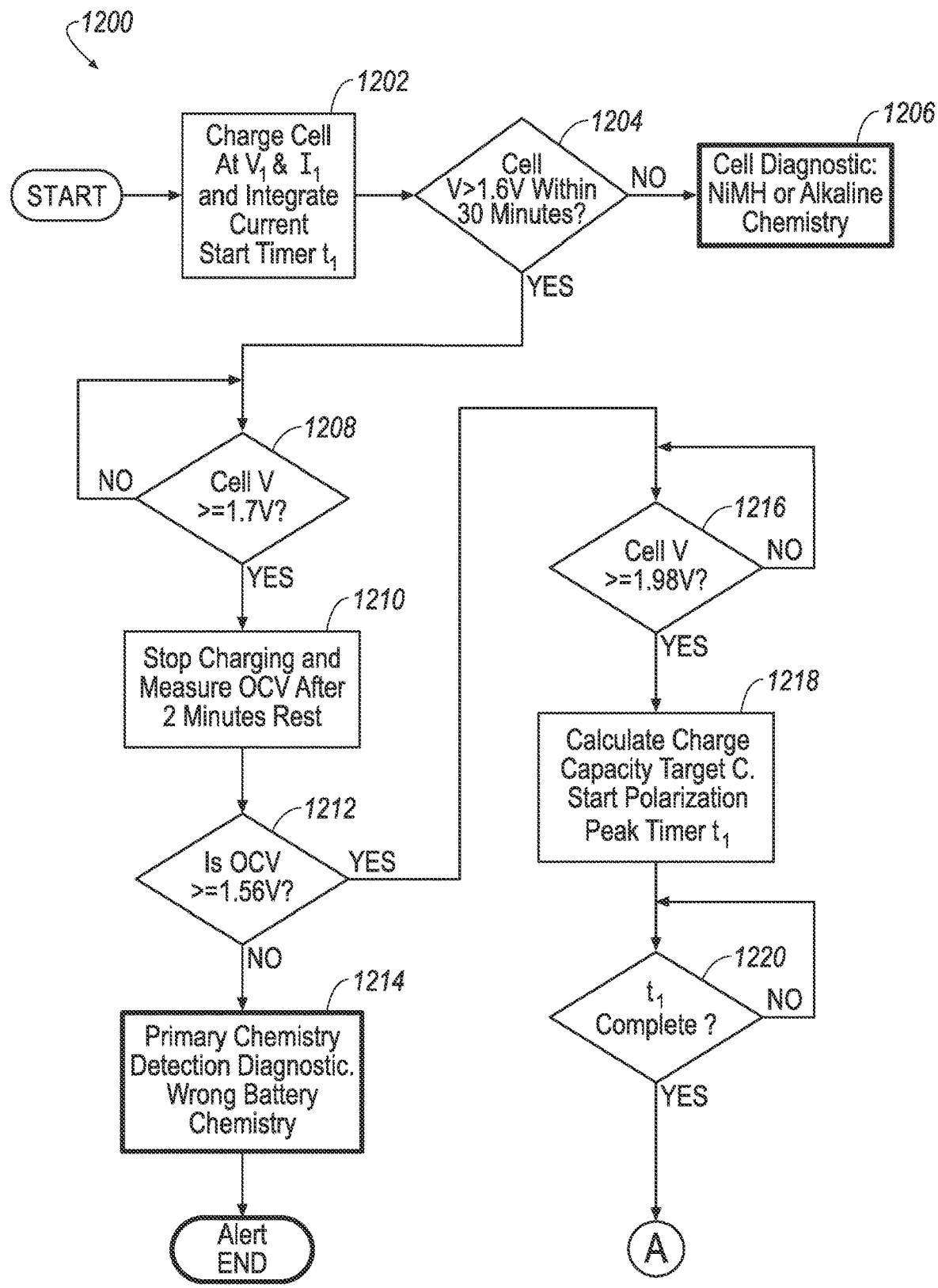
FIG. 12 provides another embodiment of a flowchart for a Zone 1 (low SOC) charge algorithm.
Figure 12B:
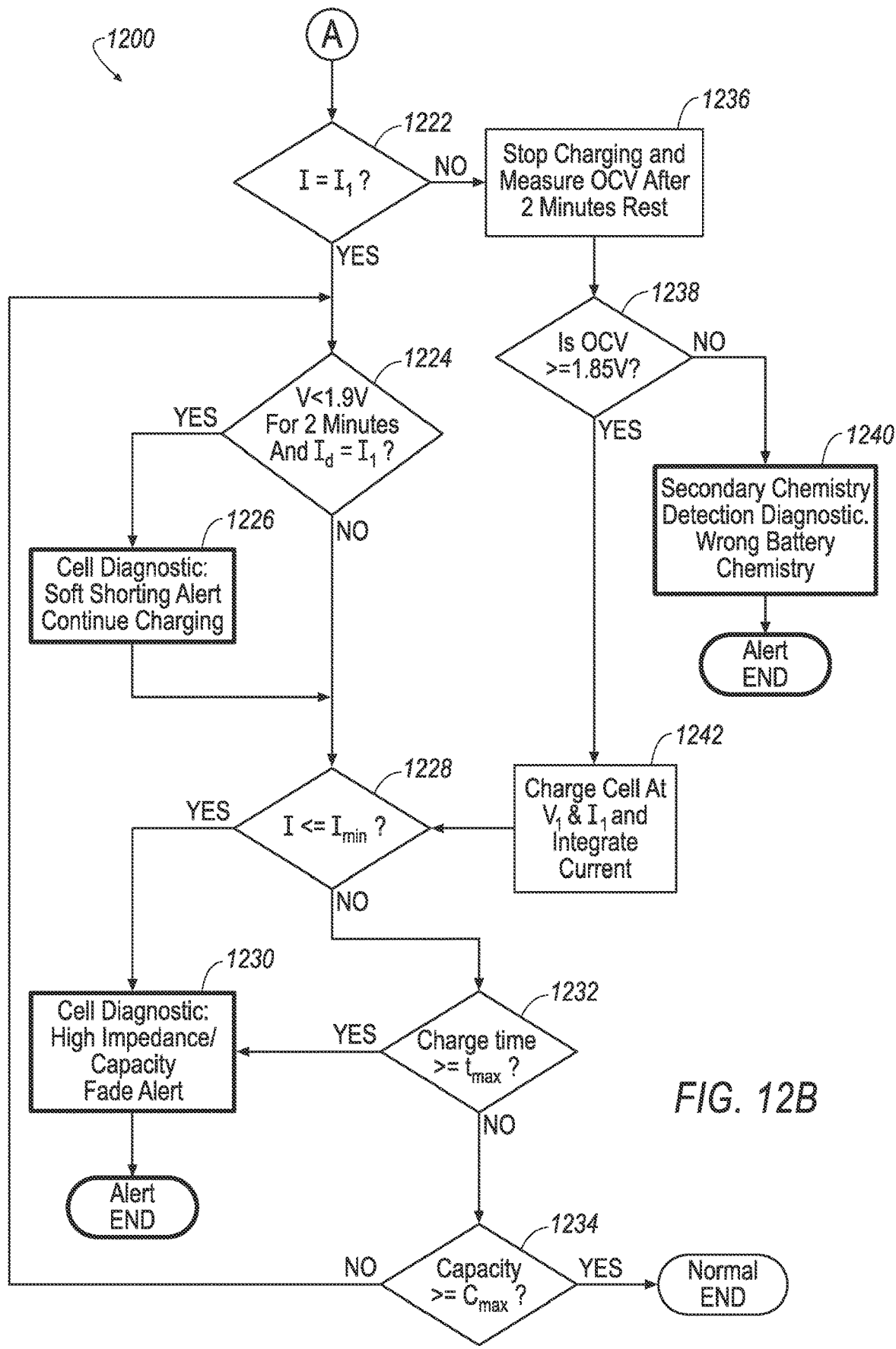

Referring to FIG. 12 an alternative illustration of a Zone 1 charging algorithm is provided. The example algorithm applies for batteries having an OCV between 1.2 V and 1.7 V. The flowchart provides for certain alerts for chemistry detection that may terminate charging of the battery. The flowchart also provides for soft-shorting alerts and high impedance/capacity fade alerts. Termination conditions including a termination current threshold (labeled as "$I_{min}$"), maximum charge time threshold (labeled as $t_{max}$) and target or maximum capacity threshold (labeled as "C or $C_{max}$") are used to terminate charging. A temperature-independent constant charge voltage is used to charge the battery as well as a constant charge current.

Figure 14:
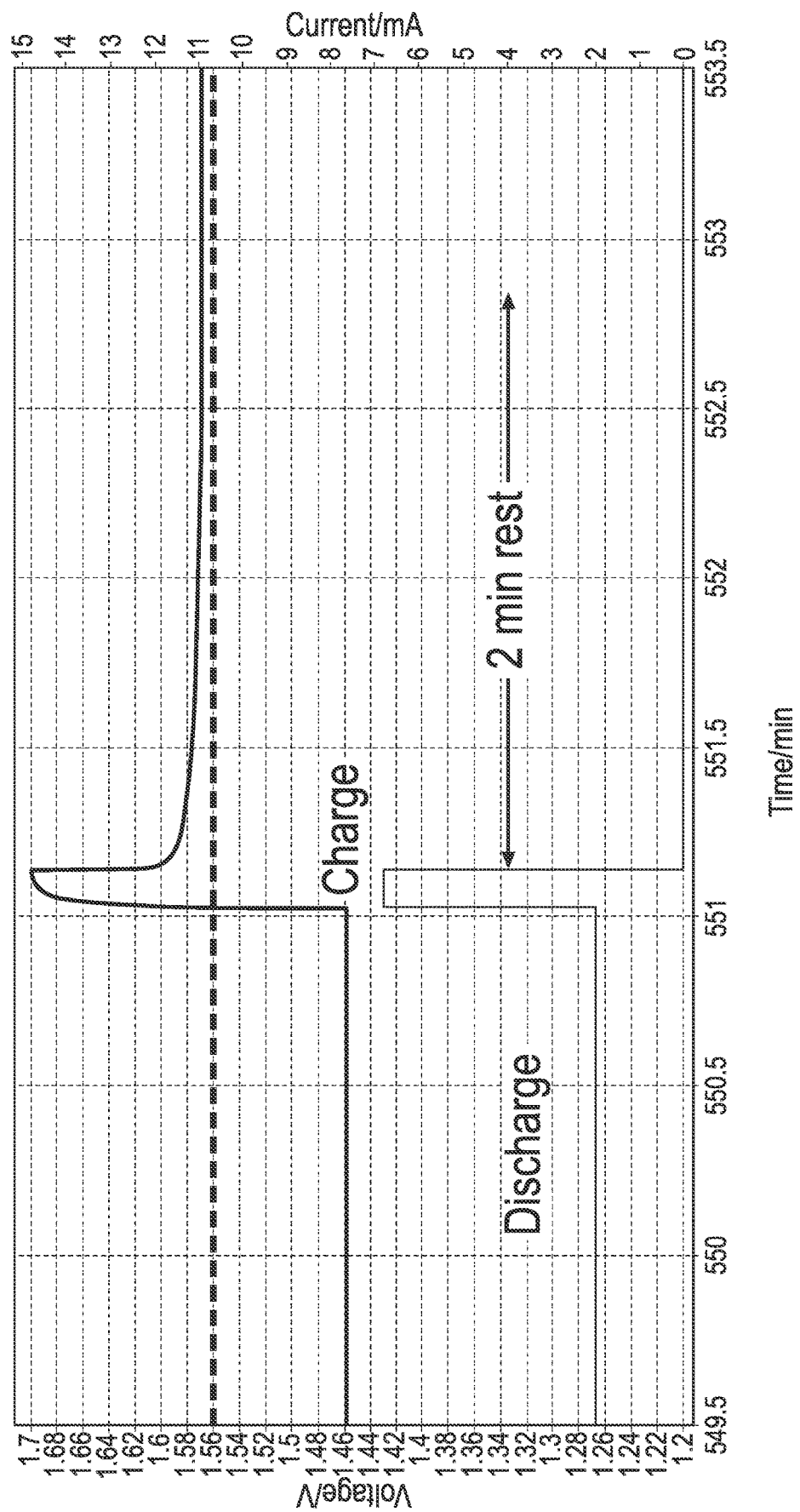
FIG. 14 illustrates detection of a silver-zinc battery via a battery chemistry detection method.
Figure 15:
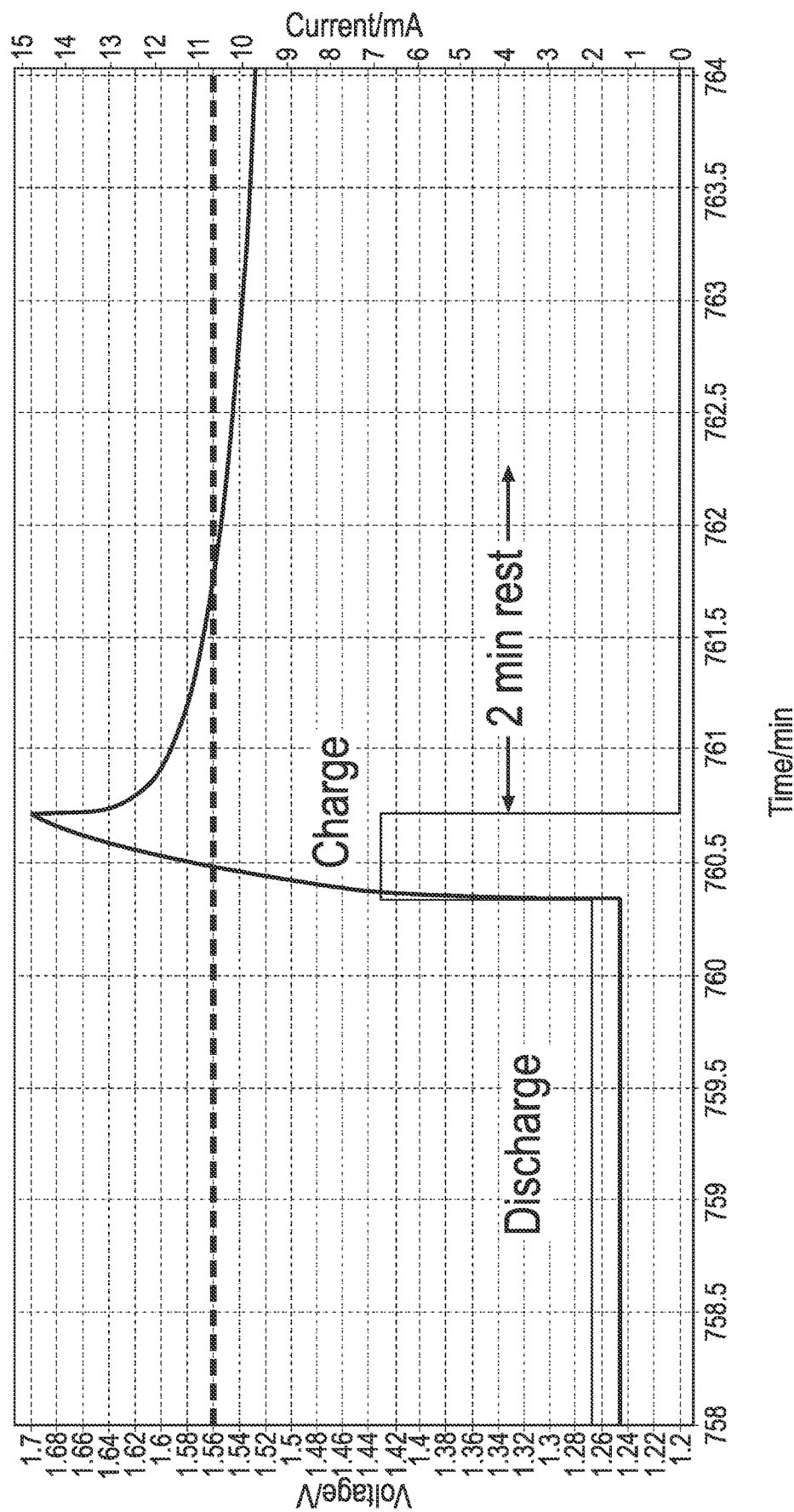
FIG. 15 illustrates detection of a zinc-air primary battery via a battery chemistry detection method.

The chemistry detection may be used to detect that a primary zinc-air battery is connected to the charger and trigger an appropriate response (e.g., charging termination and alert activation). Primary zinc-air chemistry detection method is based on the fact that zinc-air cells have a lower open circuit voltage (OCV) than silver-zinc cells. When charging starts in Zone 1, charging continues until the charge voltage reaches a threshold voltage (e.g., 1.7 V). At this point, charging is paused for a rest period (e.g., 2 minutes) allowing the cell voltage to relax down near its OCV level. For AgZn, this level is 1.57 V while zinc-air is 1.55 V. At the end of the 2 minutes, if the OCV is >=1.56 V, the cell can be identified as AgZn and charging may continue (FIG. 14). If the OCV is <1.56 V, then the cell is zinc-air and charging should terminate (FIG. 15). Examples of battery chemistry detection by this method are shown in FIGS. 14 and 15. After the rest period in FIG. 14, the OCV is greater than 1.56 V, indicating an AgZn cell. After the rest period in FIG. 15, the OCV is less than 1.56 V, indicating a primary zinc-air cell.

The chemistry detection may also comprise secondary zinc-air chemistry detection. In FIG. 12, after ti is complete, if I does not equal $I_1$, then charging is stopped and OCV is measured after a rest period (e.g., 2 minutes). If the OCV is below a threshold (e.g., 1.85 V), then the cell is secondary zinc-air and charging should terminate.

Figure 13:
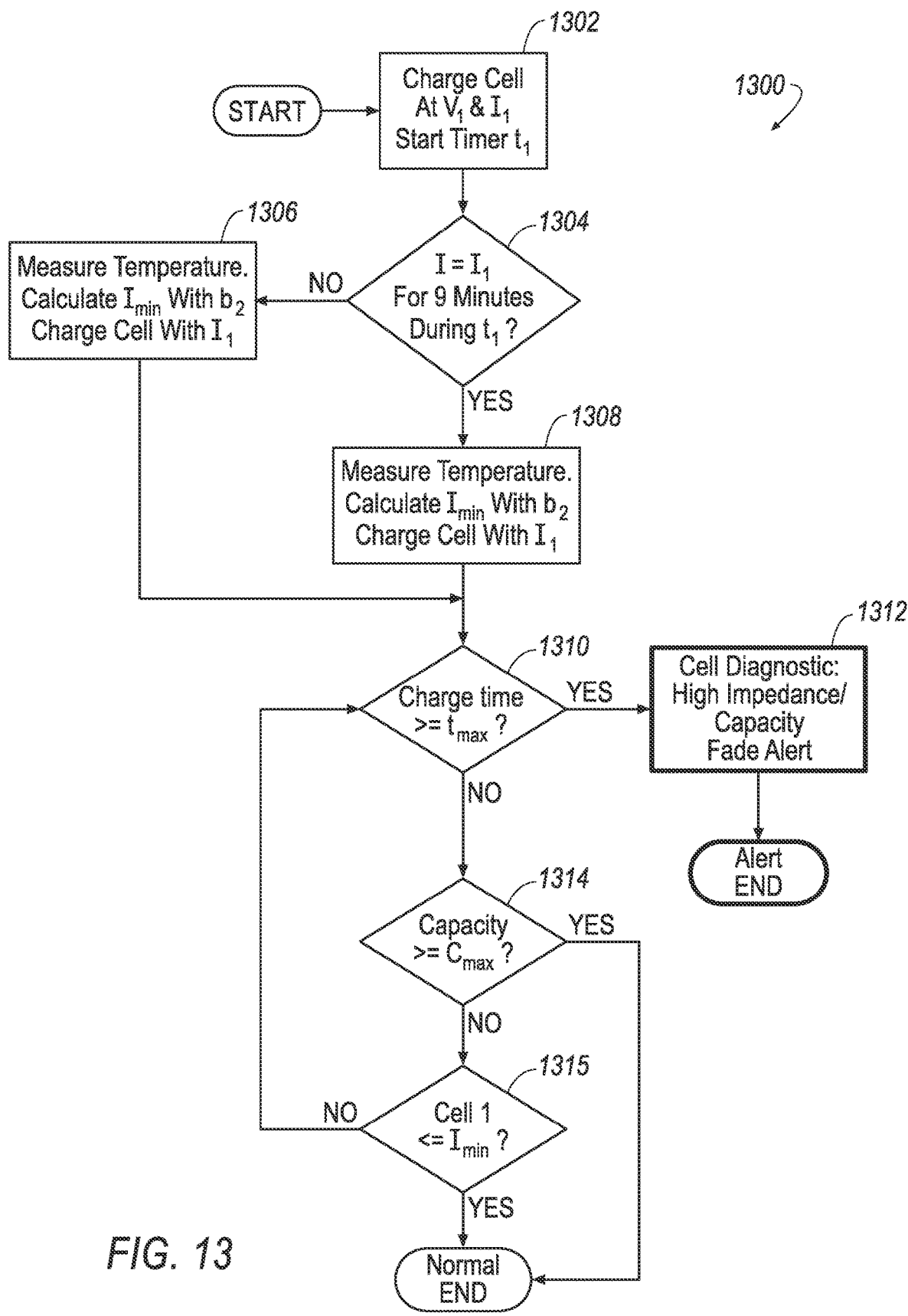
FIG. 13 provides another embodiment of a flowchart for a Zone 2 (high SOC) charge algorithm.

Referring to FIG. 13, an alternative illustration of a Zone 2 charging algorithm is provided. The example algorithm applies for batteries having an OCV above 1.7 V. A temperature-based constant charge voltage is used, as well as a constant charge current. Temperature is measured to calculate the constant charge voltage. Termination conditions including a maximum charge time threshold (labeled as "$t_{max}$"), maximum or target capacity threshold (labeled as "$C_{max}$") and termination current threshold (labeled as "$I_{min}$") are used to terminate charging. The termination current threshold, $I_{end}$ (labeled as "$I_{min}$" in FIG. 13) is calculated using the constant b1 or b2 as shown, e.g., in FIGS. 4 and 5 and the accompanying description thereof. A high impedance/capacity fade alert is provided to terminate charging if needed.

OTHER EMBODIMENTS

Implementations have been described. Nevertheless, it will be understood that various modifications may be made without departing from the spirit and scope of the disclosure. Accordingly, other implementations are within the scope of the following claims.

What is claimed is:

1. A method for charging a rechargeable battery comprising:
   estimating an initial state of charge of the battery ($SOC_0$);
   determining whether the initial state of charge of the battery ($SOC_0$) is greater than a threshold state of charge ($SOC_X$);
   when the initial state of charge of the battery ($SOC_0$) is less than or equal to the threshold state of charge ($SOC_X$), initiating a first charging strategy for charging the battery, the first charging strategy comprises charging, by charging circuitry, the battery at a temperature-independent constant charge voltage ($CV_{XT}$) and at a first current ($I_1$) with power provided from a power source in electrical communication with the charging circuitry; and when the initial state of charge of the battery ($SOC_0$) is greater than a threshold state of charge ($SOC_X$), initiating a second charging strategy for charging the battery, the second charging strategy comprising:

obtaining an environmental temperature ($T_E$) measured by a temperature sensor in communication with the charging circuitry;

calculating a temperature-based constant charge voltage ($CV_T$) based on the environmental temperature ($T_E$); and charging, by the charging circuitry, the battery at the temperature-based constant charge voltage ($CV_T$) and at a second current ($I_2$) with power provided from the power source.

2. The method of claim 1, wherein the second charging strategy further comprises:

calculating an end termination current ($I_{end}$) as a function of the environmental temperature ($T_E$); and terminating the charging of the battery when the second current ($I_2$) is less than the end termination current ($I_{end}$).

3. The method of claim 2, wherein the second charging strategy further comprises:

determining if the second current ($I_2$) is decreasing over time; and terminating the charging of the battery when the second current ($I_2$) is decreasing over time and is less than the end termination current ($T_{end}$).

4. The method of claim 1, wherein the first charging strategy further comprises:

calculating a max termination current ($I_{max}$) as a function of the environmental temperature ($T_E$) and the initial state of charge ($SOC_0$); and terminating the charging of the battery when the first current ($I_1$) is less than or equal to the max termination current ($I_{max}$).

5. The method of claim 4, wherein the first charging strategy further comprises:

setting a target capacity ($Q_{tgt}$);

determining a capacity ($Q$) of the battery; and terminating the charging of the battery when the first current ($I_1$) is less than or equal to the max termination current ($I_{max}$) and the battery capacity ($Q$) is at least the target capacity ($Q_{tgt}$).

6. The method of claim 1, wherein the first charging strategy further comprises:

redetecting battery voltage ($V_{batt}$) and changing to the second charging strategy if $V_{batt}$ is above a threshold voltage.

7. The method of claim 1, wherein the second charging strategy further comprises:

calculating a running average of battery voltages over a time ($t_{ave}$) and changing to the first charging strategy if the running average of battery voltages is less than a threshold average voltage at $t_{ave}$.

8. The method of claim 1, wherein the first charging strategy further comprises:

detecting a battery chemistry error by charging the battery to a threshold voltage, pausing charging to allow the battery voltage to relax down to about the open circuit voltage (OCV) of the battery, and determining if the OCV is below a threshold OCV.

9. The method of claim 1, wherein the threshold state of charge ($SOC_X$) is selected from a percentage between about 25% and about 75% of the battery's capacity.

10. The method of claim 1, wherein the threshold state of charge ($SOC_X$) is selected from a percentage between about 40% and about 60% of the battery's capacity.

11. The method of claim 1, further comprising measuring a time to polarization ($t_p$) of the battery, wherein the initial state of charge ($SOC_0$) is estimated as a function of the time to polarization ($t_p$).

12. The method of claim 1, wherein the initial state of charge ($SOC_0$) is estimated as a function of battery voltage ($V_{batt}$).

13. The method of claim 1, wherein the value of the temperature-based constant charge voltage ($CV_T$) is bounded by a predetermined minimum charge voltage and a predetermined maximum charge voltage.

14. The method of claim 1, wherein the environmental temperature ($T_E$) is obtained periodically.

15. The method of claim 1, wherein the rechargeable battery comprises a silver-zinc battery.

16. The method of claim 1, wherein the rechargeable battery comprises a single cell.

17. The method of claim 1, wherein the rechargeable battery comprises two or more cells in series.

18. The method of claim 1, wherein the charging circuitry is implemented upon a silicon chip.

* * * * *